United States Patent
Liu

(10) Patent No.: US 11,265,844 B2
(45) Date of Patent: Mar. 1, 2022

(54) PAGING METHOD AND APPARATUS

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 150 days.

(21) Appl. No.: 16/607,512

(22) PCT Filed: Apr. 26, 2017

(86) PCT No.: PCT/CN2017/081990
§ 371 (c)(1),
(2) Date: Oct. 23, 2019

(87) PCT Pub. No.: WO2018/195798
PCT Pub. Date: Nov. 1, 2018

(65) Prior Publication Data
US 2020/0077362 A1 Mar. 5, 2020

(51) Int. Cl.
*H04W 68/02* (2009.01)
*H04W 8/24* (2009.01)
(Continued)

(52) U.S. Cl.
CPC ............ *H04W 68/02* (2013.01); *H04W 8/24* (2013.01); *H04W 56/001* (2013.01); *H04W 72/005* (2013.01); *H04W 72/0446* (2013.01)

(58) Field of Classification Search
CPC ........... H04W 68/025; H04W 72/0446; H04W 56/001; H04W 8/24; H04W 68/02; H04W 72/005
See application file for complete search history.

(56) References Cited

U.S. PATENT DOCUMENTS

| 6,876,636 B2 * | 4/2005 | Sinnarajah | H04W 72/005 370/312 |
| 2015/0038180 A1 * | 2/2015 | Quick, Jr | H04W 36/245 455/458 |
| 2016/0278041 A1 * | 9/2016 | Frederiksen | H04W 68/005 |

FOREIGN PATENT DOCUMENTS

| CN | 101155167 A | 4/2008 |
| CN | 101385364 A | 3/2009 |
(Continued)

OTHER PUBLICATIONS

Notification of Granting the Patent Right of Chinese Application No. 201780000266.8 dated May 8, 2020.
(Continued)

*Primary Examiner* — Anez C Ebrahim
(74) *Attorney, Agent, or Firm* — Finnegan, Henderson, Farabow, Garrett & Dunner, L.L.P.

(57) ABSTRACT

The present disclosure provides a paging method and apparatus, pertaining to the technical field of communications. The method includes: acquiring first paging indication information and at least one piece of second paging indication information based on current paging details of each User Equipment (UE) and a UE identifier of the each UE, a bit of the first paging indication information being configured to indicate whether a paged UE is present in a UE group, and a bit of the second paging indication information being configured to indicate whether a UE in a UE group is paged; broadcasting the first paging indication information on a first paging time-domain resource, the first paging time-domain resource being a time-domain resource for an information synchronization; and broadcasting the at least one piece of second paging indication information on a second paging time-domain resource. According to the present disclosure, occupation of transmission resources is reduced by broadcasting paging indication information.

15 Claims, 10 Drawing Sheets

(51) Int. Cl.
    *H04W 56/00*    (2009.01)
    *H04W 72/00*    (2009.01)
    *H04W 72/04*    (2009.01)

(56) References Cited

FOREIGN PATENT DOCUMENTS

| | | |
|---|---|---|
| CN | 101491149 A | 7/2009 |
| CN | 102209389 A | 10/2011 |
| CN | 102958141 A | 3/2013 |
| CN | 103096258 A | 5/2013 |
| WO | WO 2016/119206 A1 | 8/2016 |

OTHER PUBLICATIONS

International Search Report and Written Opinion of PCT Application No. PCT/CN2017/081990, dated Jan. 4, 2018, issued by the State Intellectual Property Office of the P.R. China.
First Office Action dated Apr. 24, 2019, in counterpart Chinese Application No. 201780000266.8 and English translation thereof.
Second Office Action dated Sep. 18, 2019, in counterpart Chinese Application No. 201780000266.8.
Third Office Action dated Jan. 9, 2020, in counterpart Chinese Application No. 201780000266.8 and English translation thereof.
ZTE, ZTE Microelectronics; 3GPP TSG RAN WG1 Meeting #88 R1-1701579, Athens, Greece, Feb. 13-17, 2017, 8 pgs.

* cited by examiner

PAGING METHOD AND APPARATUS

CROSS REFERENCE TO RELATED APPLICATIONS

This application is a national phase application of International Application PCT/CN2017/081990, filed on Apr. 26, 2017, the entire contents of which are incorporated herein by reference.

TECHNICAL FIELD

The present disclosure relates to the technical field of communications, and in particular, relates to a paging method and apparatus.

BACKGROUND

In a communication system, a base station may not determine specific locations of UEs that are in an idle state or a deactive state. To enable a UE to communicate with other UEs via the base station, the base station needs to initiate paging to the UE.

During the paging, since the location of the UE may not be determined, the base station broadcasts a paging message, such that each UE within the coverage of the base station may monitor the paging message and determine whether the UE is paged based on a UE identifier in the paging message. If it is determined that the UE is paged, a response is made; and otherwise, the paging message is ignored.

During implementation of the present application, the inventors find that the related art has at least the following problem:

The $5^{th}$ generation (5G) mobile communication technology may employ high-frequency resources to carry out communications in a beamforming manner. If the original paging method is still used, since the specific location of the UE within the coverage of the base station may not be determined, the base station needs to send a beam bearing the paging message to various directions to ensure that the UE to be paged may receive the paging message, which causes a waste of transmission resources. Therefore, a paging method adaptive to 5G is urgently desired.

SUMMARY

To solve the problem in the related art, embodiments of the present disclosure provide a paging method and a paging apparatus. The specific technical solutions are as follows:

In a first aspect, a paging method is provided. The method is applied to a base station and the method includes the following steps:

acquiring first paging indication information and at least one piece of second paging indication information based on current paging details of each User Equipment (UE) and a UE identifier of the each UE, a bit of the first paging indication information being configured to indicate whether a paged UE is present in a UE group, and a bit of the second paging indication information being configured to indicate whether a UE in a UE group is paged;

broadcasting the first paging indication information on a first paging time-domain resource, the first paging time-domain resource being a time-domain resource for an information synchronization; and broadcasting the at least one piece of second paging indication information on a second paging time-domain resource.

In some embodiments, wherein the acquiring first paging indication information and at least one piece of second paging indication information based on current paging details of each UE and the UE identifier of the each UE comprises:

determining a corresponding group of each UE and a serial number of the UE in the corresponding group based on the UE identifier of the each UE;

determining a group number of a UE group as the bit, corresponding to the UE group, of the first paging indication information, and acquiring the first paging indication information based on the current paging details of each UE group and a bit, corresponding to the each UE group respectively, of the first paging indication information; and determining the group number of each UE group as a serial number of the each second paging indication information corresponding to each UE group, determining a serial number of a UE in the corresponding UE group as a bit, corresponding to the UE, in the corresponding second paging indication information, and acquiring the at least one piece of second paging indication information based on the current paging details of the each UE, the serial numbers of the second paging indication information corresponding to each UE group, and a bit, corresponding to each UE respectively, of the corresponding second paging indication information.

In some embodiments, wherein the acquiring first paging indication information and at least one piece of second paging indication information based on current paging details of each UE and the UE identifier of the each UE comprises:

determining, based on the UE identifiers and capability information of each UE, a UE group corresponding to low-delay UEs and a serial number of each low-delay UE in the corresponding UE group, and determining a UE group corresponding to non-low-delays UE and a serial number of each non-low-delay UE in the corresponding UE group;

determining a group number of a UE group as the bit, corresponding to the UE group, of the first paging indication information, and acquiring the first paging indication information based on the current paging details of each UE group and a bit, corresponding to the each UE group respectively, of the first paging indication information; and determining the group number of the non-low-delay UE group as a serial number of the second paging indication information corresponding to the non-low-delay UE group, determining a serial number of each non-low-delay UE in the corresponding UE group as a bit, corresponding to each non-low-delay UE respectively, in the corresponding second paging indication information, and acquiring the at least one piece of second paging indication information based on the current paging details of the each non-low-delay UE, the serial number of the second paging indication information corresponding to each non-low-delay UE group, and a bit, corresponding to each non-low-delay UE, of the corresponding second paging indication information.

In some embodiments, wherein the broadcasting the first paging indication information on a first paging time-domain resource comprises:

broadcasting the first paging indication information on a first frequency-domain resource and the first paging time-domain resource, the first frequency-domain resource referring to a frequency-domain resource pre-configured for the each UE; or broadcasting the first paging indication information on a second frequency-domain resource and the first paging time-domain resource, the second frequency-domain resource being informed by a base station to the each UE over system information; or broadcasting the first paging indication information on a third frequency-domain resource and the first paging time-domain resource, a first frequency-domain parameter of the third frequency-domain resource being pre-configured for the each UE, and a second frequency-domain parameter of the third frequency-domain resource being informed by the base station to the each UE over the system information.

wherein the broadcasting the at least one piece of second paging indication information on a second paging time-domain resource comprises:

broadcasting the second paging indication information on a fourth frequency-domain resource and the second paging time-domain resource, the fourth frequency-domain resource referring to a frequency-domain resource pre-configured for the each UE; or broadcasting the second paging indication information on a fifth frequency-domain resource and the second paging time-domain resource, the fifth frequency-domain resource being informed by the base station to the each UE over system information; or broadcasting the second paging indication information on a sixth frequency-domain resource and the second paging time-domain resource, a first frequency-domain parameter of the sixth frequency-domain resource being pre-configured for the each UE, and a second frequency-domain parameter of the sixth frequency-domain resource being informed by the base station to the each UE over the system information.

In some embodiments, wherein the second paging time-domain resource refers to a time-domain resource pre-configured for the each UE; or the second paging time-domain resource is informed by the base station to the each UE over system information; or a first time-domain parameter of the second paging time-domain resource is pre-configured for the each UE, and a second time-domain parameter of the second paging time-domain resource is informed by the base station to the each UE over the system information.

In some embodiments, the method further comprising:

upon receiving location information of any UE, sending a paging message to the UE based on the location information of the UE.

In a second aspect, a paging method is provided. The method is applied to a user equipment (UE), the method including:

when capability information indicates a UE is a low-delay UE, determining a bit, corresponding to a UE group of the UE, of first paging indication information based on a UE identifier of the UE, the bit of the first paging indication information being configured to indicate whether a paged UE, is present in the UE group;

receiving the first paging indication information on a first paging time-domain resource, the first paging time-domain resource being a time-domain resource for an information synchronization; and sending location information of the UE to a base station when the bit, corresponding to the UE group of the UE, of the first paging indication information indicates that the UE group of the UE is paged.

In some embodiments, wherein the when capability information indicates a UE, is a low-delay UE, determining a bit, corresponding to a UE group of the UE, of first paging indication information based on a UE identifier of the UE, comprises:

determining, based on the UE identifier of the UE, the UE group of the UE when the capability information indicates that the UE is a low-delay UE; and determining the serial number of the UE group of the UE as the bit, corresponding to the UE group of the UE, of the first paging indication information.

In some embodiments, wherein the receiving the first paging indication information on a first paging time-domain resource comprises:

receiving the first paging indication information on a first frequency-domain resource and the first paging time-domain resource, the first frequency-domain resource referring to a frequency-domain resource pre-configured for the UE; or receiving the first paging indication information on a second frequency-domain resource and the first paging time-domain resource, the second frequency-domain resource being informed by the base station to the UE over system information; or receiving the first paging indication information on a third frequency-domain resource and the first paging time-domain resource, a first frequency-domain parameter of the third frequency-domain resource being pre-configured for the UE, and a second frequency-domain parameter of the third frequency-domain resource being informed by the base station to the UE over the system information.

In some embodiments, wherein after receiving the first paging indication information on a first paging time-domain resource, the method further comprises:

ignoring the first paging indication information when the bit, corresponding to the UE group of the UE, of the first paging indication information indicates that the corresponding UE group is not paged.

In a third aspect, a paging method is provided. The method is applied to a user equipment (UE), and the method includes the following steps:

when capability information indicates that the UE is a non-low-delay UE, determining a bit, corresponding to a UE group of the UE, of first paging indication information based on a UE identifier of the UE, second paging indication information corresponding to the UE, and a bit, corresponding to the UE, of the corresponding second paging indication information; the first paging time-domain resource being a time-domain resource for an information synchronization;

receiving the first paging indication information on a first paging time-domain resource, a bit of the first paging indication information being configured to indicate whether a paged UE is present in a UE group;

when the bit, corresponding to the UE group of the UE, of the first paging indication information indicates that the UE group of the UE is paged, receiving the second paging indication information on a second paging time-domain resource, the bit of the second paging indication information being configured to indicate whether a UE of the UE group is paged;

sending location information of the UE to a base station when the bit, corresponding to the UE, of the second paging indication information indicates that the UE is paged.

In some embodiments, wherein when capability information indicates that the UE is a non-low-delay UE, determining a bit, corresponding to a UE group of the UE, of first paging indication information based on a UE identifier of the UE, second paging indication information corresponding to the UE, and a bit, corresponding to the UE, of the corresponding second paging indication information comprises:

when capability information indicates that the UE is a non-low-delay UE, determining the UE group of the UE and a serial number of the UE in the UE group based on the UE identifier of the UE;

determining a group number of the UE group as the bit, corresponding to the UE group, of the first paging indication information, and determining the group number of the UE group as a serial number of the second paging indication information corresponding to the UE group; and determining the serial number of the UE in the corresponding UE group as a bit, corresponding to the UE, of second paging indication information.

In some embodiments, wherein the receiving the first paging indication information on a first paging time-domain resource comprises:

receiving the first paging indication information on a first frequency-domain resource and the first paging time-domain resource, the first frequency-domain resource referring to a frequency-domain resource pre-configured for the UE; or receiving the first paging indication information on a second frequency-domain resource and the first paging time-domain resource, the second frequency-domain resource being informed by the base station to the UE over system information; or receiving the first paging indication information on a third frequency-domain resource and the first paging time-domain resource, a first frequency-domain parameter in the third frequency-domain resource being pre-configured for the UE, and a second frequency-domain parameter in the third frequency-domain resource being informed by the base station to the UE over the system information.

In some embodiments, wherein the when the bit, corresponding to the UE group of the UE, of the first paging indication information indicates that the UE group of the UE is paged, receiving the second paging indication information on a second paging time-domain resource comprises:

when the bit, corresponding to the UE group of the UE, of the first paging indication information indicates that the UE group of the UE is paged, receiving the second paging indication information on a fourth frequency-domain resource and the second paging time-domain resource, the fourth frequency-domain resource referring to a frequency-domain resource pre-configured for the UE: or When the bit, corresponding to the UE group of the UE, of the first paging indication information indicates that the UE group of the UE is paged, receiving the second paging indication information on a fifth frequency-domain resource and the second paging time-domain, the fifth frequency-domain resource being informed by the base station to the UE; or when the bit, corresponding to the UE group of the UE, of the first paging indication information indicates that the UE group of the UE is paged, receiving the second paging indication information on a sixth frequency-domain resource and the second paging time-domain, a first frequency-domain parameter of the sixth frequency-domain resource being pre-configured for the UE, and a second frequency-domain parameter of the sixth frequency-domain resource being informed by the base station to the UE.

In some embodiments, wherein the second paging time-domain resource refers to a time-domain resource pre-configured for the UE; or the second paging time-domain resource is informed by the base station to the UE over system information; or a first time-domain parameter in the second paging time-domain resource is pre-configured for the UE, and a second time-domain parameter in the second paging time-domain resource is informed by the base station to each UE over the system information.

In some embodiments, wherein after receiving the first paging indication information on a first paging time-domain resource, the method further comprises:

ignoring the first paging indication information when the bit, corresponding to the UE group of the UE, of the first paging indication information indicates that the corresponding UE group is not paged.

In some embodiments, wherein when the bit, corresponding to the UE group of the UE, of the first paging indication information indicates that the UE group of the UE is paged, after receiving the second paging indication information on a second paging time-domain resource, the method further comprises:

ignoring the second paging indication information when the bit, corresponding to the UE, of the second paging indication information indicates that the corresponding UE is not paged.

In a fourth aspect, a paging apparatus is provided. The apparatus is applied to a base station, and the apparatus including:

an acquiring module, configured to acquire first paging indication information and at least one piece of second paging indication information based on current paging details of each User Equipment (UE) and a UE identifier of the each UE, a bit of the first paging indication information being configured to indicate whether a paged UE is present in a UE group, and a bit of the second paging indication information being configured to indicate whether a UE in a UE group is paged;

a first broadcasting module, configured to broadcast the first paging indication information on a first paging time-domain resource, the first paging time-domain resource being a time-domain resource for an information synchronization; and a second broadcasting module, configured to broadcast the at least one piece of second paging indication information on a second paging time-domain resource.

In some embodiments, wherein the acquiring module is configured to:

determine a corresponding group of each UE and a serial number of the UE in the corresponding group based on the UE identifier of the each UE;

determine a group number of a UE group as the bit, corresponding to the UE group, of the first paging indication information, and acquire the first paging indication information based on the current paging details of each UE group and a bit, corresponding to the each UE group respectively, of the first paging indication information; and determine the group number of each UE group as a serial number of the each second paging indication information corresponding to each UE group, determining a serial number of a UE in the corresponding UE group as a bit, corresponding to the UE, in the corresponding second paging indication information, and acquire the at least one piece of second paging indication information based on the current paging details of the each UE, the serial numbers of the second paging indication information corresponding to each UE group, and a bit, corresponding to each UE respectively, of the corresponding second paging indication information.

In some embodiments, wherein the acquiring module is configured to:

determine, based on the UE identifiers and capability information of each UE, a UE group corresponding to low-delay UEs and a serial number of each low-delay UE in the corresponding UE group, and determine a UE group corresponding to non-low-delays UE and a serial number of each non-low-delay UE in the corresponding UE group;

determine a group number of a UE group as the bit, corresponding to the UE group, of the first paging indication information, and acquire the first paging indication information based on the current paging details of each UE group and a bit, corresponding to the each UE group respectively, of the first paging indication information; and determine the group number of the non-low-delay UE group as a serial number of the second paging indication information corresponding to the non-low-delay UE group, determine a serial number of each non-low-delay UE in the corresponding UE group as a bit, corresponding to each non-low-delay UE respectively, in the corresponding second paging indication information, and acquiring the at least one piece of second paging indication information based on the current paging details of the each non-low-delay UE, the serial number of the second paging indication information corresponding to each non-low-delay UE group, and a bit, corresponding to each non-low-delay UE, of the corresponding second paging indication information.

In some embodiments, wherein the first broadcasting module is configured to broadcast the first paging indication information on a first frequency-domain resource and the first paging time-domain resource, the first frequency-domain resource referring to a frequency-domain resource pre-configured for the each UE; or the first broadcasting module is configured to broadcast the first paging indication information on a second frequency-domain resource and the first paging time-domain resource, the second frequency-domain resource being informed by a base station to the each UE over system information; or the first broadcasting module is configured to broadcast the first paging indication information on a third frequency-domain resource and the first paging time-domain resource, a first frequency-domain parameter of the third frequency-domain resource being pre-configured for the each UE, and a second frequency-domain parameter of the third frequency-domain resource being informed by the base station to the each UE over the system information.

In some embodiments, wherein the second broadcasting module is configured to broadcast the second paging indication information on a fourth frequency-domain resource and the second paging time-domain resource, the fourth frequency-domain resource referring to a frequency-domain resource pre-configured for the each UE; or the second broadcasting module is configured to broadcast the second paging indication information on a fifth frequency-domain resource and the second paging time-domain resource, the fifth frequency-domain resource being informed by the base station to the each UE over system information; or the second broadcasting module is configured to broadcast the second paging indication information on a sixth frequency-domain resource and the second paging time-domain resource, a first frequency-domain parameter of the sixth frequency-domain resource being pre-configured for the each UE and a second frequency-domain parameter of the sixth frequency-domain resource being informed by the base station to the each UE over the system information.

In some embodiments, wherein the second paging time-domain resource refers to a time-domain resource pre-configured for the each UE; or the second paging time-domain resource is informed by the base station to the each UE over system information; or a first time-domain parameter in the second paging time-domain resource is pre-configured for the each UE, and a second time-domain parameter in the second paging time-domain resource is informed by the base station to the each UE over the system information.

In some embodiments, further comprising:

a sending module, configured to, upon receiving location information of any UE, send a paging message to the UE based on the location information of the UE.

In a fifth aspect, a paging apparatus is provided. The apparatus is applied to a user equipment (UE), and the apparatus including:

a determining module, configured to, when capability information indicates a UE is a low-delay UE, determine a bit, corresponding to a UE group of the UE, of first paging indication information based on a UE identifier of the UE, the bit of the first paging indication information being configured to indicate whether a paged UE is present in the UE group;

a receiving module, configured to receive the first paging indication information on a first paging time-domain resource, the first paging time-domain resource being a time-domain resource for an information synchronization; and a sending module, configured to send location information of the UE to a base station when the bit, corresponding to the UE group of the UE, of the first paging indication information indicates that the UE group of the UE is paged.

In some embodiments, wherein the determining module is configured to:

determine, based on the UE identifier of the UE, the UE group of the UE when the capability information indicates that the UE is a low-delay UE; and determine the serial number of the UE group of the UE as the bit, corresponding to the UE group of the UE, of the first paging indication information.

In some embodiments, wherein the receiving module is configured to receive the first paging indication information on a first frequency-domain resource and the first paging time-domain resource, the first frequency-domain resource referring to a frequency-domain resource pre-configured for the UE; or the receiving module is configured to receive the first paging indication information on a second frequency-domain resource and the first paging time-domain resource, the second frequency-domain resource being informed by the base station to the UE over system information; or the receiving module is configured to receive the first paging indication information on a third frequency-domain resource and the first paging time-domain resource, a first frequency-domain parameter in the third frequency-domain resource being pre-configured for the UE, and a second frequency-domain parameter in the third frequency-domain resource being informed by the base station to the UE over the system information.

In some embodiments, further comprising:

an ignoring module, configured to ignore the first paging indication information when the bit, corresponding to the UE group of the UE, of the first paging indication information indicates that the corresponding UE group is not paged.

In a sixth aspect, a paging apparatus is provided. The apparatus is applied to a user equipment (UE), and the apparatus including:

a determining module, configured to, when capability information indicates that the UE is a non-low-delay UE, determine a bit, corresponding to a UE group of the UE, of first paging indication information based on a UE identifier of the UE, second paging indication information corresponding to the UE, and a bit, corresponding to the UE, of the corresponding second paging indication information; the first paging time-domain resource being a time-domain resource for an information synchronization;

a receiving module, configured to receive the first paging indication information on a first paging time-domain resource, a bit of the first paging indication information being configured to indicate whether a paged UE is present in a UE group;

wherein the receiving module is further configured to, when the bit, corresponding to the UE group of the UE, of the first paging indication information indicates that the UE group of the UE is paged, receiving the second paging indication information on a second paging time-domain resource, the bit of the second paging indication information being configured to indicate whether a UE of the UE group is paged; and a sending module, configured to send location information of the UE to a base station when the bit, corresponding to the UE, of the second paging indication information indicates that the UE is paged.

In some embodiments, wherein the determining module is configured to:

when capability information indicates that the UE is a non-low-delay UE, determine the UE group of the UE and a serial number of the UE in the UE group based on the UE identifier of the UE;

determine a group number of the UE group as the bit, corresponding to the UE group, of the first paging indication information, and determine the group number of the UE group as a serial number of the second paging indication information corresponding to the UE group; and determine the serial number of the UE in the corresponding UE group as a bit, corresponding to the UE, of second paging indication information.

In some embodiments, wherein the receiving module is further configured to receive the first paging indication information on a first frequency-domain resource and the first paging time-domain resource, the first frequency-domain resource referring to a frequency-domain resource pre-configured for the UE; or the receiving module is further configured to receive the first paging indication information on a second frequency-domain resource and the first paging time-domain resource, the second frequency-domain resource being informed by the base station to the UE over system information; or the receiving module is further configured to receive the first paging indication information on a third frequency-domain resource and the first paging time-domain resource, a first frequency-domain parameter of the third frequency-domain resource being pre-configured for the UE, and a second frequency-domain parameter of the third frequency-domain resource being informed by the base station to the UE over the system information.

In some embodiments, wherein the receiving module is further configured to, when the bit, corresponding to the UE group of the UE, of the first paging indication information indicates that the UE group of the UE is paged, receiving the second paging indication information on a fourth frequency-domain resource and the second paging time-domain resource, the fourth frequency-domain resource referring to a frequency-domain resource pre-configured for the UE; or the receiving module is further configured to, when the bit, corresponding to the UE group of the UE, of the first paging indication information indicates that the UE group of the UE is paged, receiving the second paging indication information on a fifth frequency-domain resource and the second paging time-domain, the fifth frequency-domain resource being informed by the base station to the UE; or the receiving module is further configured to, when the bit, corresponding to the UE group of the UE, of the first paging indication information indicates that the UE group of the UE is paged, receiving the second paging indication information on a sixth frequency-domain resource and the second paging time-domain, a first frequency-domain parameter of the sixth frequency-domain resource being pre-configured for the UE, and a second frequency-domain parameter of the sixth frequency-domain resource being informed by the base station to the UE.

In some embodiments, wherein the second paging time-domain resource refers to a time-domain resource pre-configured for the UE; or the second paging time-domain resource is informed by the base station to the UE over system information; or a first time-domain parameter in the second paging time-domain resource is pre-configured for the UE, and a second time-domain parameter in the second paging time-domain resource is informed by the base station to the each UE over the system information.

In some embodiments, further comprising:

a first ignoring module, configured to ignore the first paging indication information when the bit, corresponding to the UE group of the UE, of the first paging indication information indicates that the corresponding UE group is not paged.

In some embodiments, further comprising:

a second ignoring module, configured to ignore the second paging indication information when the bit, corresponding to the UE, of the second paging indication information indicates that the corresponding UE is not paged.

In a seventh aspect, a paging apparatus is provided. The apparatus including:

a processor; and a memory for storing instructions executable by the processor;

wherein the processor is configured to:

acquire first paging indication information and at least one piece of second paging indication information based on current paging details of each User Equipment (UE) and a UE identifier of the each UE, a bit of the first paging indication information being configured to indicate whether a paged UE is present in a UE group, and a bit of the second paging indication information being configured to indicate whether a UE in a UE group is paged; broadcast the first paging indication information on a first paging time-domain resource, the first paging time-domain resource being a time-domain resource for an information synchronization; and broadcast the at least one piece of second paging indication information on a second paging time-domain resource.

In an eighth aspect, a paging apparatus is provided. The apparatus including:

a processor; and a memory for storing instructions executable by the processor;

wherein the processor is configured to:

when capability information indicates a UE is a low-delay UE, determine a bit, corresponding to a UE group of the UE, of first paging indication information based on a UE identifier of the UE, the bit of the first paging indication information being configured to indicate whether a paged UE is present in the UE group; receive the first paging indication information on a first paging time-domain resource, the first paging time-domain resource being a time-domain resource for an information synchronization; and send location information of the UE to a base station when the bit, corresponding to the UE group of the UE, of the first paging indication information indicates that the UE group of the UE is paged.

In a ninth aspect, a paging apparatus is provided. The apparatus including:

a processor; and a memory for storing instructions executable by the processor;

wherein the processor is configured to:

when capability information indicates that the UE is a non-low-delay UE, determine a bit, corresponding to a UE group of the UE, of first paging indication information based on a UE identifier of the UE, second paving indication information corresponding to the UE, and a bit, corresponding to the UE, of the corresponding second paging indication information; the first paging time-domain resource being a time-domain resource for an information synchronization;

receive the first paging indication information on a first paging time-domain resource, a bit of the first paging indication information being configured to indicate whether a paged UE is present in a UE group;

when the bit, corresponding to the UE group of the UE, of the first paging indication information indicates that the UE group of the UE is paged, receive the second paging indication information on a second paging time-domain resource, the bit of the second paging indication information being configured to indicate whether a UE of the UE group is paged;

sending location information of the UE to a base station when the bit, corresponding to the UE, of the second paging indication information indicates that the UE is paged.

It is to be understood that both the foregoing general description and the following detailed description are exemplary and explanatory only and are intended to limit the present disclosure.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

The embodiments of the present disclosure will be described in further detail with reference to the accompanying drawings, to present the objects, technical solutions, and advantages of the present disclosure more clearly.

Figure 1:
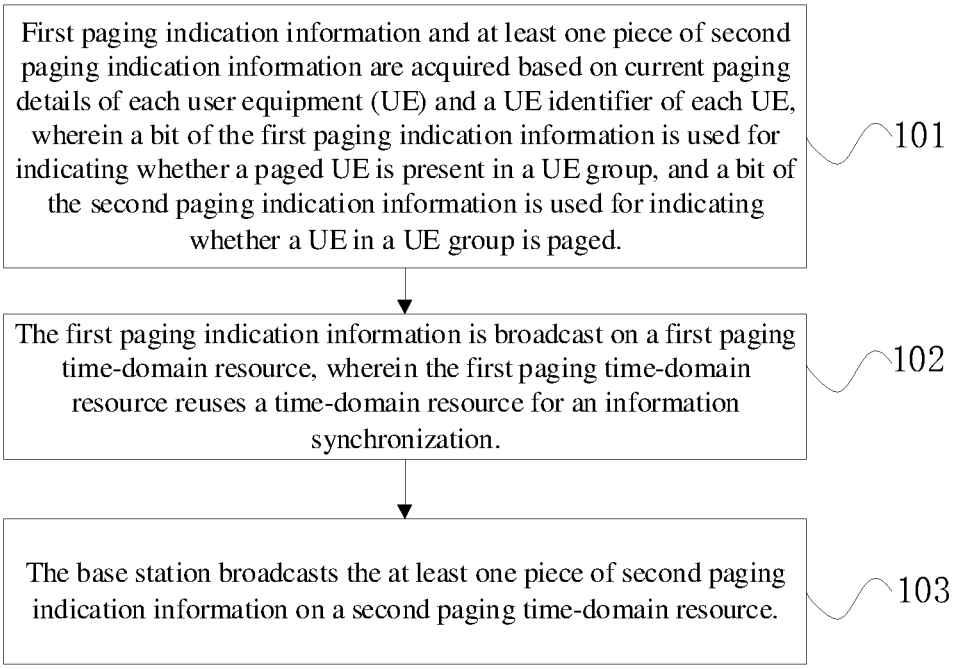
FIG. 1 is a flowchart of a paging method according to an exemplary embodiment of the present disclosure.

FIG. 1 is a flowchart of a paging method according to an exemplary embodiment of the present disclosure. Referring to FIG. 1, the method is applied to a base station, and includes the following steps:

In step 101, first paging indication information and at least one piece of second paging indication information are acquired based on current paging details of each user equipment (UE) and a UE identifier of each UE, wherein a bit of the first paging indication information is used for indicating whether a paged UE is present in a UE group, and a bit of the second paging indication information is used for indicating whether a UE in a UE group is paged.

In step 102, the first paging indication information is broadcast on a first paging time-domain resource, wherein the first paging time-domain resource reuses a time-domain resource for an information synchronization.

In step 103, the at least one piece of second paging indication information is broadcast on a second paging time-domain resource.

According to the embodiments of the present disclosure, first paging indication information and second paging indication information are acquired based on the UE identifier of each UE and current paging details of the each UE; the paging indication information is broadcasted such that a UE may determine a corresponding bit thereof in the paging indication information based on the UE identifier thereof; when the bit indicates that a corresponding group of the UE is paged, location information of the UE is sent to a base station such that the base station may page the UE based on the location information; and meanwhile, since an information amount of the paging indication information is greatly reduced relative to paging messages, relative to broadcasting paging messages in a multi-beam manner, broadcasting the paging indication information reduces occupation of transmission resources.

In one possible implementation manner, the acquiring first paging indication information and at least one piece of second paging indication information based on current paging details of each UE and the UE identifier of the each UE comprises:

determining a corresponding group of each UE and a serial number of the UE in the corresponding group based on the UE identifier of the each UE;

determining a group number of a UE group as the bit, corresponding to the UE group, of the first paging indication information, and acquiring the first paging indication information based on the current paging details of each UE group and each bit, corresponding to the each UE group, of the first paging indication information; and determining the group number of each UE group as a serial number of the each second paging indication information corresponding to each UE group, determining a serial number of a UE in the corresponding UE group as a bit, corresponding to the UE, in the corresponding second paging indication information, and acquiring the at least one piece of second paging indication information based on the current paging details of the each UE, the serial numbers of the second paging indication information corresponding to each UE group, and each bit, corresponding to each UE, of the corresponding second paging indication information.

In one possible implementation manner, the acquiring first paging indication information and at least one piece of second paging indication information based on current paging details of each UE and the UE identifier of the each UE comprises:

determining, based on the UE identifiers and capability information of each UE, a UE group corresponding to a low-delay UE and a serial number of the low-delay UE in the corresponding UE group, and determining a UE group corresponding to a non-low-delay UE and a serial number of the non-low-delay UE in the corresponding UE group;

determining a group number of a UE group as the bit, corresponding to the UE group, of the first paging indication information, and acquiring the first paging indication information based on the current paging details of each UE group and a bit, corresponding to the each UE group, of the first paging indication information; and determining the group number of the non-low-delay UE group as a serial number of the second paging indication information corresponding to the non-low-delay UE group, determining a serial number of a non-low-delay UE in the corresponding UE group as a bit, corresponding to the non-low-delay UE, in the corresponding second paging indication information, and acquiring the at least one piece of second paging indication information based on the current paging details of the each non-low-delay UE, the serial number of the second paging indication information corresponding to each non-low-delay UE group, and a bit, corresponding to each non-low-delay UE, of the second paging indication information.

In one possible implementation manner, the broadcasting the first paging indication information on a first paging time-domain resource comprises:

broadcasting the first paging indication information on a first frequency-domain resource and the first paging time-domain resource, the first frequency-domain resource referring to a frequency-domain resource pre-configured for the each UE; or broadcasting the first paging indication information on a second frequency-domain resource and the first paging time-domain resource, the second frequency-domain resource being informed by a base station to the each UE over system information; or broadcasting the first paging indication information on a third frequency-domain resource and the first paging time-domain resource, a first frequency-domain parameter of the third frequency-domain resource being pre-configured for the each UE, and a second frequency-domain parameter of the third frequency-domain resource being informed by the base station to the each UE over the system information.

In one possible implementation manner, the broadcasting the at least one piece of second paging indication information on a second paging time-domain resource comprises:

broadcasting the second paging indication information on a fourth frequency-domain resource and the second paging time-domain resource, the fourth frequency-domain resource referring to a frequency-domain resource pre-configured for the each UE; or broadcasting the second paging indication information on a fifth frequency-domain resource and the second paging time-domain resource, the fifth frequency-domain resource being informed by the base station to the each UE over system information; or broadcasting the second paging indication information on a sixth frequency-domain resource and the second paging time-domain resource, a first frequency-domain parameter of the sixth frequency-domain resource being pre-configured for the each UE, and a second frequency-domain parameter of the sixth frequency-domain resource being informed by the base station to the each UE over the system information.

In one possible implementation manner, the second paging time-domain resource refers to a time-domain resource pre-configured for the each UE; or the second paging time-domain resource is informed by the base station to the each UE over system information; or a first time-domain parameter of the second paging time-domain resource is pre-configured for the each UE, and a second time-domain parameter of the second paging time-domain resource is informed by the base station to the each UE over the system information.

In a possible implementation manner, the method further includes:

upon receiving location information of any UE, sending a paging message to the UE based on the location information of the UE.

All the above optional technical solutions may form the optional embodiments of the present disclosure in any combination, which are not described herein any further.

Figure 2:
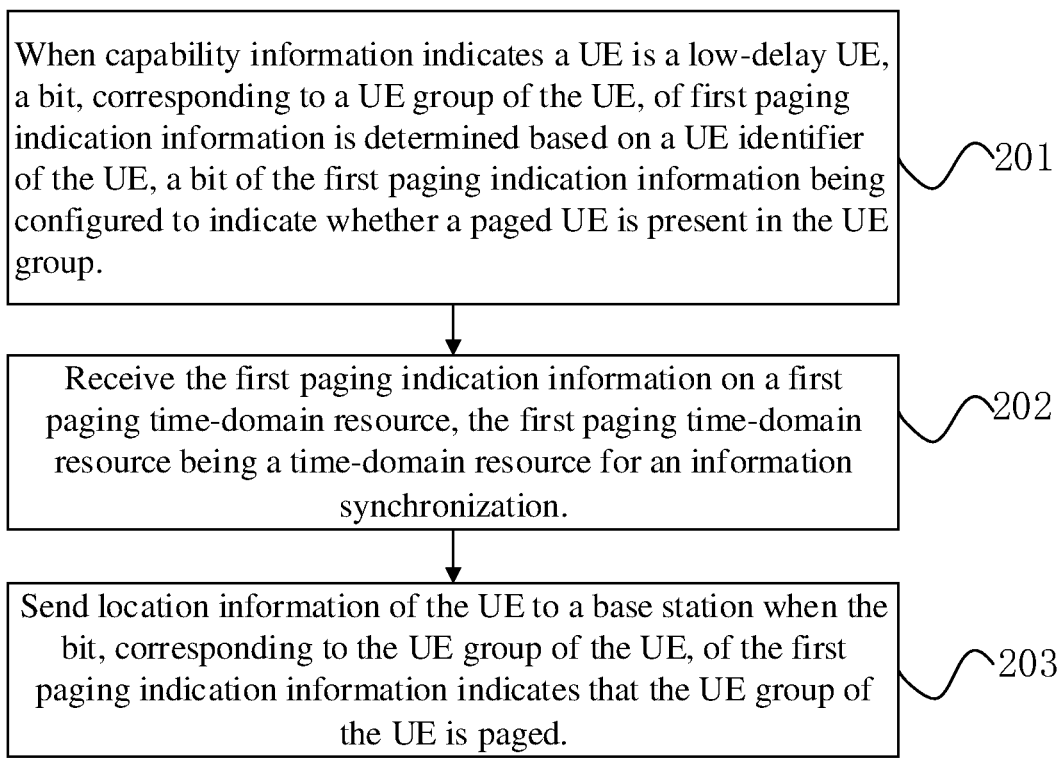
FIG. 2 is a flowchart of a paging method according to an exemplary embodiment of the present disclosure.

FIG. 2 is a flowchart of a paging method according to an exemplary embodiment of the present disclosure. Referring to FIG. 2, the method is applied to a UE, and includes the following steps:

In step 201, when capability information indicates a UE is a low-delay UE, a bit, corresponding to a UE group of the UE, of first paging indication information is determined based on a UE identifier of the UE, a bit of the first paging indication information being configured to indicate whether a paged UE is present in the UE group;

In step 202, receive the first paging indication information on a first paging time-domain resource, the first paging time-domain resource being a time-domain resource for an information synchronization; and In step 203, send location information of the UE to a base station when the bit, corresponding to the UE group of the UE, of the first paging indication information indicates that the UE group of the UE is paged.

According to the embodiments of the present disclosure, a bit, corresponding to a UE group, of the first paging indication information is determined based on an UE identifier of the UE; when the bit indicates that the corresponding UE group of the UE is paged, location information is sent to a base station such that the base station may page the UE based on the location information quickly; and meanwhile, since an information amount of the paging indication information is greatly reduced relative to paging messages, relative to broadcasting paging messages in a multi-beam manner, broadcasting the paging indication information reduces occupation of transmission resources.

In one possible implementation manner, the determining, based on a UE identifier of the UE, a corresponding bit, corresponding to a UE group of the UE, of first paging indication information, when capability information indicates the UE is a low-delay UE comprises:

determining, based on the UE identifier of the UE, the UE group of the UE when the capability information indicates that the UE is a low-delay UE; and determining the serial number of the UE group of the UE as the bit, corresponding to the UE group of the UE, of the first paging indication information.

In one possible implementation manner, the receiving the first paging indication information on a first paging time-domain resource comprises:

receiving the first paging indication information on a first frequency-domain resource and the first paging time-domain resource, the first frequency-domain resource referring to a frequency-domain resource pre-configured for the UE; or receiving the first paging indication information on a second frequency-domain resource and the first paging time-domain resource, the second frequency-domain resource being informed by the base station to the UE over system information; or receiving the first paging indication information on a third frequency-domain resource and the first paging time-domain resource, a first frequency-domain parameter of the third frequency-domain resource being pre-configured for the UE, and a second frequency-domain parameter of the third frequency-domain resource being informed by the base station to the UE over the system information.

In one possible implementation manner, after receiving the first paging indication information on a first paging time-domain resource, the method further comprises:

ignoring the first paging indication information when the bit, corresponding to the UE group of the UE, of the first paging indication information indicates that the corresponding UE group is not paged.

All the above optional technical solutions may form the optional embodiments of the present disclosure in any combination, which are not described herein any further.

Figure 3:
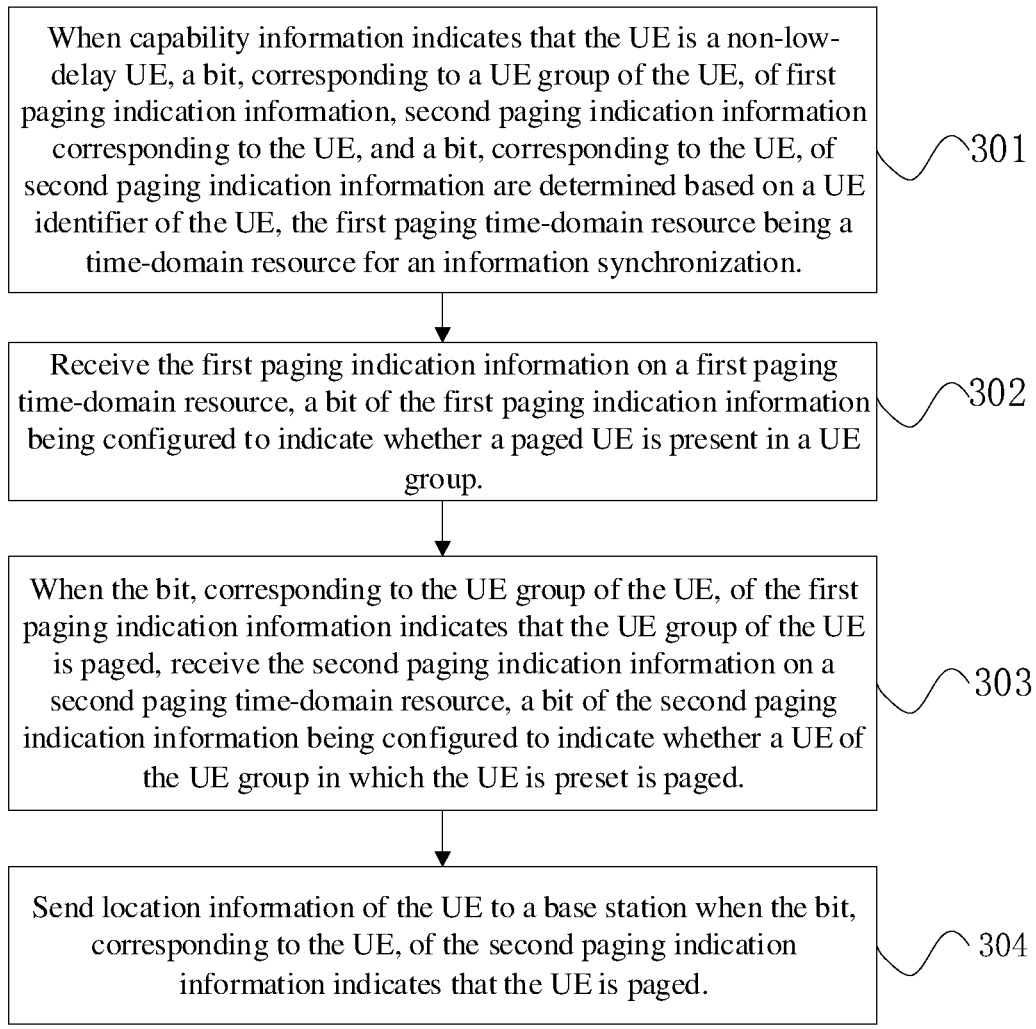
FIG. 3 is a flowchart of a paging method according to an exemplary embodiment of the present disclosure.

FIG. 3 is a flowchart of a paging method according to an exemplary embodiment of the present disclosure. Referring to FIG. 3, the method is applied to a UE, and includes the following steps:

In step 301, when capability information indicates that the UE is a non-low-delay UE, a bit, corresponding to a UE group of the UE, of first paging indication information, second paging indication information corresponding to the UE, and a bit, corresponding to the UE, of second paging indication information are determined based on a UE identifier of the UE, the first paging time-domain resource being a time-domain resource for an information synchronization;

In step 302, receive the first paging indication information on a first paging time-domain resource, a bit of the first paging indication information being configured to indicate whether a paged UE is present in a UE group;

In step 303, when the bit, corresponding to the UE group of the UE, of the first paging indication information indicates that the UE group of the UE is paged, receive the second paging indication information on a second paging time-domain resource, the bit of the second paging indication information being configured to indicate whether a UE of the UE group in which the UE presents is paged;

In step 304, send location information of the UE to a base station when the bit, corresponding to the UE, of the second paging indication information indicates that the UE is paged.

According to the embodiment of the present disclosure, a bit, corresponding to a UE group, of the first paging indication information is determined based on a UE identifier of the UE; when the bit indicates that the corresponding UE group is paged, corresponding second paging indication information is continuously received; when a bit, corresponding to the UE, of the second paging indication information indicates that the UE is paged, location information of the UE is sent to a base station, such that the base station may accurately pages the UE directly based on the location information; and in addition, since an information amount of the paging indication information is greatly reduced relative to paging messages, relative to broadcasting paging messages in a multi-beam manner, broadcasting the paging indication information reduces occupation of transmission resources.

In one possible implementation manner, when capability information indicates that the UE is a non-low-delay UE, determining, based on the UE identifier of the UE, a bit, corresponding to a UE group in which a UE presents, of first paging indication information, second paging indication information corresponding to the UE, and a bit, corresponding to the UE, of second paging indication information comprises:

when capability information indicates that the UE is a non-low-delay UE, determining the UE group of the UE and a serial number of the UE in the corresponding UE group based on the UE identifier of the UE;

determining a group number of the UE as the bit, corresponding to the group of the UE, of the first paging indication information, and determining the group number of the UE as a serial number of the second paging indication information corresponding to the UE; and determining the serial number of the UE in the corresponding UE group as a bit, corresponding to the UE, of second paging indication information.

wherein the receiving the first paging indication information on a first paging time-domain resource comprises:

receiving the first paging indication information on a first frequency-domain resource and the first paging time-domain resource, the first frequency-domain resource referring to a frequency-domain resource pre-configured for the UE; or receiving the first paging indication information on a second frequency-domain resource and the first paging time-domain resource, the second frequency-domain resource being informed by the base station to the UE over system information; or receiving the first paging indication information on a third frequency-domain resource and the first paging time-domain resource, a first frequency-domain parameter in the third frequency-domain resource being pre-configured for the UE, and a second frequency-domain parameter in the third frequency-domain resource being informed by the base station to the UE over the system information.

In one possible implementation manner, the when the bit, corresponding to the UE group of the UE, of the first paging indication information indicates that the UE group of the UE is paged, receiving the second paging indication information on a second paging time-domain resource comprises:

when the bit, corresponding to the UE group of the UE, of the first paging indication information indicates that the UE group of the UE is paged, receiving the second paging indication information on a fourth frequency-domain resource and the second paging time-domain resource, the fourth frequency-domain resource referring to a frequency-domain resource pre-configured for the UE; or when the bit, corresponding to the UE group of the UE, of the first paging indication information indicates that the LIE group of the UE is paged, receiving the second paging indication information on a fifth frequency-domain resource and the second paging time-domain, the fifth frequency-domain resource being informed by the base station to the UE; or when the bit, corresponding to the UE group of the UE, of the first paging indication information indicates that the UE group of the UE is paged, receiving the second paging indication information on a sixth frequency-domain resource and the second paging time-domain, a first frequency-domain parameter of the sixth frequency-domain resource being pre-configured for the UE, and a second frequency-domain parameter of the sixth frequency-domain resource being informed by the base station to the UE.

In one possible implementation manner, the second paging time-domain resource refers to a time-domain resource pre-configured for the UE; or the second paging time-domain resource is informed by the base station to the UE over system information; or a first time-domain parameter in the second paging time-domain resource is pre-configured for the UE, and a second time-domain parameter in the second paging time-domain resource is informed by the base station to each UE over the system information.

In one possible implementation manner, after receiving the first paging indication information on a first paging time-domain resource, the method further comprises:

ignoring the first paging indication information when the bit, corresponding to the UE group of the UE, of the first paging indication information indicates that the corresponding UE group is not paged.

In one possible implementation manner, when the bit, corresponding to the UE group of the UE, of the first paging indication information indicates that the UE group of the UE is paged, after receiving the second paging indication information on a second paging time-domain resource, the method further comprises:

ignoring the second paging indication information when the bit, corresponding to the UE, of the second paging indication information indicates that the corresponding UE is not paged.

All the above optional technical solutions may form the optional embodiments of the present disclosure in any combination, which are not described herein any further.

Figure 4:
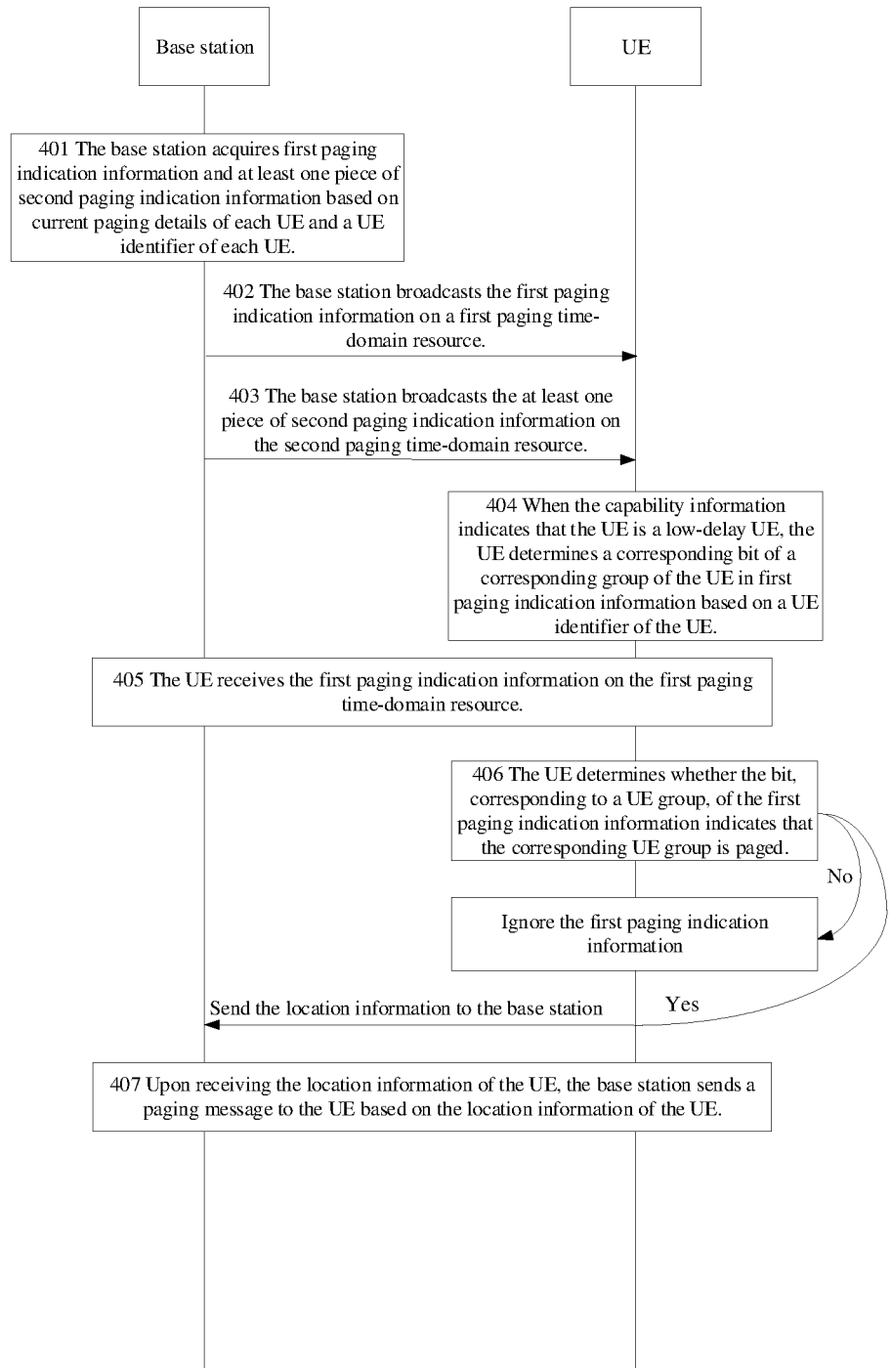
FIG. 4 is a flowchart of a paging method according to an exemplary embodiment of the present disclosure.
Figure 5:
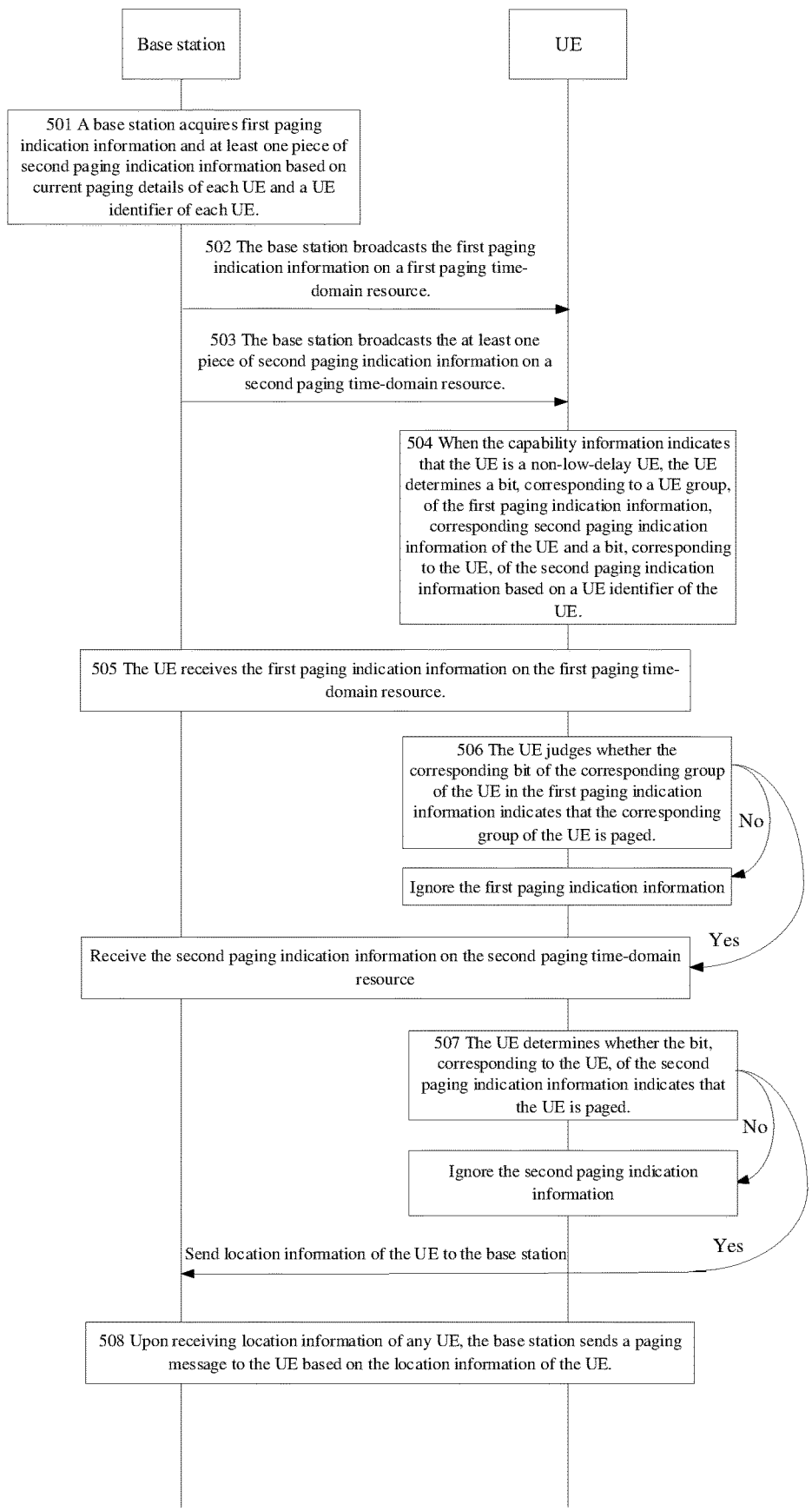
FIG. 5 is a flowchart of a paging method according to an exemplary embodiment of the present disclosure.

In some embodiments of the present disclosure, the base station may page not only a low-delay UE, but also a non-low-delay UE. Embodiments of the present disclosure will describe an interaction process between a base station and a low-delay UE with reference to examples as illustrated in FIG. 4, and describe an interaction process between a base station and a non-low-delay UE with reference to examples as illustrated in FIG. 5. For example, FIG. 4 is a flowchart of a paging method according to embodiments of the present disclosure. Referring to FIG. 4, the method may include the following steps:

In step 401, the base station acquires first paging indication information and at least one piece of second paging indication information based on current paging details of each UE and a UE identifier of the each UE, wherein a bit of the first paging indication information is used for indicating whether a paged UE is present in a group of UEs, and a bit of the second paging indication information is used for indicating whether a UE in a group of UEs is paged.

The each UE refers to a UE whose specific location may not be determined by the base station, which is generally a UE in an idle state or a deactive state. A UE identifier is used for uniquely identifying the UE, which is not limited to an International Mobile Subscriber Identification Number (IMSI).

The process of acquiring the first paging indication information may be specifically as follows: The base station determines a group to which each UE belongs based on the UE identifier of the each UE; uses a group number of each group of UEs as a corresponding bit of the each group of UEs in the first paging indication information, and acquires the first paging indication information based on paging details of various groups of UEs and corresponding a bit of the various groups of UEs in the first paging indication information.

In this acquisition process, the base station may perform calculation in combination with the UE identifier of each UE and a configured calculation parameter based on a configured calculation manner to obtain a corresponding result value; wherein the number of UEs in a configured group of UEs is used as a divisor, the result value is used as a dividend, and a quotient is determined as the corresponding group number of the UE. For example, the calculation manner is a way of deriving a reminder from the calculation parameter by the UE identifier, the calculation parameter is 100, the UE identifier of the UE is 1900123, and the result value is 23. In this case, assuming that the number of UE in a UE group is 8, the group number of the UE group corresponding to the UE may be 2, and then the bit, corresponding to the second UE group, in the first paging indication information is 2.

After each bit, corresponding to the each group respectively, of the first paging indication information is determined, the base station may set the value of each bit corresponding to each UE of the UE group to 1 (or 0) based on the current paging details of the UE group if a paged UE is present in the UE group, and the base station may set the value of each bit corresponding to each UE of the UE group to 0 (or 1) based on the current paging details of the UE group if no paged UE is present in the UE group. In this way, the first paging indication information may be acquired.

The process of acquiring the second paging indication information may be specifically as follows: The base station determines a group to which each UE belongs and a serial number of each UE in the corresponding group based on the UE identifier of the each UE, uses a group number of each of the UE groups as a serial number of second paging indication information corresponding to the UE group. After the serial number of the second paging indication information corresponding to the each UE group and the bit, corresponding to each UE, of the corresponding second paging indication information are determined, the base station may set the value of each bit, corresponding to each UE, of the corresponding second paging indication information to 1 (or 0) based on the current paging detail of each UE if a UE in a UE group is paged; UE group, uses serial numbers of each UE in the UE group as a bit, corresponding to the each UE, of the second paging indication information, and acquires the at least one piece of second paging indication information based on the current paging details of the each UE, the serial numbers of the corresponding second paging indication information of the UE groups and a bit, corresponding to the each UE, of the second paging indication information.

During this acquisition process, the group to which each UE belongs is determined during the acquisition of the first paging indication information. In addition, the base station may determine a reminder obtained by dividing the result value by the number of UEs in a UE group as the serial number of the UE in the corresponding group. For example, if the result value is 23, and the number of UEs in a UE group is 8, then the corresponding group number of the UE may be 2, the serial number of the second paging indication corresponding to the second UE group may be 2, and the serial number of the UE in the second paging indication information with serial number 2 may be 7.

After the serial number of the second paging indication information corresponding to the each UE group and the bit, corresponding to each UE, in the corresponding second paging indication information are determined, the base station may set the value of each bit, corresponding to each UE, of the corresponding second paging indication information to 1 (or 0) based on the current paging detail of each UE if a UE in a UE group is paged; and if the UE is not paged, the base station may set the value of bit, corresponding to the UE, of the corresponding second paging indication information to 0 (or 1), until the value of each bit of the second paging indication information is successfully set. In this way, the at least one piece of second paging indication information may be acquired.

In a practical application scenario, the above acquisition process may not only generate and acquire the paging indication information in real time each time the paging indication information needs to be broadcast, but also modify the values on a part of bits therein based on previously generated paging indication information and the current paging details, such that the paging indication information that needs to be broadcast at this time may be acquired.

It should be noted that capability information of each UE may be different, and the capability information is used for indicating whether the UE is a low-delay UE or a non-low-delay UE. The low-delay UE refers to a UE that imposes a higher requirement on communication delay, for example, a UE that imposes a requirement that the communication delay is less than a predetermined threshold; and the non-low-delay UE refers to a UE other than the low-delay UE. The capability information is configured in the UE, and may be sent to the base station when the UE is initially registered to the base station. In order that the paging indication information complies with the capability information of the each UE and meets the requirements of the UEs on the communication delay, the low-delay UE may immediately make a response upon receiving the first paging indication information, with no need to receive the second paging indication information. Therefore, when acquiring the second paging indication information, the base station may determine the serial number of the second paging indication information corresponding to the non-low-delay UE and a bit, corresponding to the low-delay UE, in the corresponding second paging indication information based on the capability information of the each UE, with no need to determine the above information of the low-delay UE. In this way, acquisition efficiency is improved. Nevertheless, after the value on the corresponding bit of the non-low-delay UE is set, the base station may randomly determine the values on the remaining bits (that is, the values of the corresponding bits of the low-delay UEs).

In consideration that the low-delay UE may still complete the paging without reference to the second paging indication information, to reduce occupation of the transmission resources, the acquisition process in this step may include the following steps (1) to (3):

(1) The base station determines, based on the UE identifiers and capability information of the each UE, a corresponding group to which a low-delay UE belongs and a serial number of the low-delay UE in the corresponding group, and determines a corresponding group of a non-low-delay UE and a serial number of the non-low-delay UE in the corresponding group.

In step (1), the base station may make the above determinations by a plurality of ways. For example, the base station determines the corresponding group of a non-low-delay UE and the serial number thereof in the corresponding group in combination with a configured calculation formula and calculation parameter; determines the corresponding group of a low-delay UE and the serial number thereof in the corresponding group in combination with a configured calculation formula, calculation parameter and offset parameter; wherein a sum of the offset parameter and the group number calculated based on the calculation formula and the calculation parameter is the corresponding group number of the low-delay UE, such that a group of UEs is formed by all low-delay UEs or non-low-delay UEs. The group formed by merely low-delay UEs may be named as a low-delay UE group, and the group formed by merely non-low-delay UEs may be named as a non-low-delay UE group.

Specifically, the calculation formula, the calculation parameter and the number of UEs in a UE group are as described above, assuming that the offset parameter is 6, the UE identifier of the non-low-delay UE is 1900123, and the UE identifier of the low-delay UE is 1900213, then the group number of the group corresponding to the non-low-delay UE is 2, and the serial number of the non-low-delay UE in the corresponding group is 7; and assuming the group number obtained based on the calculation formula and the calculation parameter is 0, then the group number of the group corresponding to the low-delay UE is 0+6=6, and the serial number of the low-delay UE in the corresponding group is 3. Apparently, the offset parameter is equivalent to the number of groups of the low-delay UEs (which is 6 in the above example).

(2) The base station uses a group number of each UE group as a bit, corresponding to each UE group, of the first paging indication information, and acquires the first paging indication information based on the current paging details of the each UE group and a bit corresponding to the each UE group.

This process is similar to the process of acquiring the first paging indication information.

(3) The base station uses the group number of a non-low delay UE group as a serial number of the corresponding second paging indication information of the non-low delay UE group, uses a serial number of the non-low-delay UE in the corresponding group as a bit, corresponding to the non-low-delay UE, of the corresponding second paging indication information, and acquires the at least one piece of second paging indication information based on the current paging details of each non-low-delay UE, the serial numbers of the corresponding second paging indication information of the each UE group and a bit, corresponding to each non-low-delay UE, in the corresponding second paging indication information.

In consideration that a low-delay UE may still be paged without the second paging indication information, the base station does not need to acquire the corresponding second paging indication information of the low-delay UE group, such that acquisition efficiency is improved and transmission resources are saved. Referring to the example in step (1), the base station may acquire second paging indication information with serial numbers 0 to 5.

In step 402, the base station broadcasts the first paging indication information on a first paging time-domain resource, wherein the first paging time-domain resource reuses a time-domain resource for an information synchronization.

Because time-domain resources for an information synchronization may be configured on the UE side, to reduce parameter configurations on the UE side, the first paging time-domain resource reuses the time-domain resource for the information synchronization. During the broadcasting, the base station may demodulate the first paging indication information to a usable frequency-domain resource, and broadcast the first paging indication information on the first paging time-domain resource. Embodiments of the present disclosure sets no limitation to a cycle for broadcasting. In addition, Embodiment of the present disclosure sets no limitation to the frequency-domain resource usable by the first paging indication information and a configuration manner thereof. For example, an allocation manner of the frequency-domain resources may be referenced to example 1 to example 3.

Example 1: The base station broadcasts the first paging indication information on a first frequency-domain resource and the first paging time-domain resource, wherein the first frequency-domain resource refers to a frequency-domain resource pre-configured for the each UE.

In this example, the first frequency-domain resource be predetermined with the UE. Specifically, the first frequency-domain resource may multiplex the frequency-domain resource for an information synchronization, such that a new frequency-domain resource does not need to be additionally configured on the UE. In this way, the parameter configurations on the UE side are reduced.

Example 2: The base station broadcasts the first paging indication information on a second frequency-domain resource and the first paging time-domain resource, wherein the second frequency-domain resource is informed by the base station to the each UE over system information.

In this example, the base station may flexibly allocate the second frequency-domain resource based on the current usage details of the frequency-domain resources, with no need to pre-configure the second frequency-domain resource on the UE. In this way, the parameter configurations on the UE side are reduced. The second frequency-domain resource may be informed as follows: The base station informs time and frequency resources of physical downlink control channels of the each UE by broadcasting the system information, such that the each UE may obtain the second frequency-domain resource used by the first paging indication information on physical downlink shared channels based on the physical downlink control channels.

Example 3: The base station broadcasts the first paging indication information on a third frequency-domain resource and the first paging time-domain resource, wherein a first frequency-domain parameter in the third frequency-domain resource is pre-configured for the each UE, and a second frequency-domain parameter in the third frequency-domain resource is informed by the base station to the each UE over the system information.

In this example, in consideration that the frequency-domain resource is generally indicated by two frequency-domain parameters, for example, a frequency-domain start parameter and a frequency-domain offset parameter, or a frequency-domain start parameter and a frequency-domain end parameter, one of the frequency-domain parameters may be pre-configured for the each UE, and the other frequency-domain parameter may be notified by the base station to the each UE over system information. In this way, the frequency-domain resource may be flexibly configured, and the parameter configurations on the UE side may be appropriately reduced.

In step 403, the base station broadcasts the at least one piece of second paging indication information on the second paging time-domain resource.

During the broadcasting, the base station may use the serial number of each second paging indication information as a subframe number of the second paging indication information on the second paging time-domain resource, and broadcast the second paging indication information on the corresponding subframe of each second paging indication information. Nevertheless, a cycle for broadcasting the at least one piece of second paging indication information is the same as that for broadcasting the first paging indication information. It should be noted that the embodiment of the present disclosure sets no limitation to the frequency-domain resource usable by the first paging indication information and an allocation manner thereof. For example, the allocation manner of the frequency-domain resources may be referenced to example 4 to example 6.

Example 4: The base station broadcasts the second paging indication information on a fourth frequency-domain resource and the second paging time-domain resource, wherein the fourth frequency-domain resource refers to a frequency-domain resource pre-configured for the each UE.

Example 4 is similar to example 1. It should be noted that in consideration that the low-delay UE does not need the second paging indication information, the fourth frequency-domain resource may be pre-configured for the non-low-delay UE, whereas the fourth frequency-domain resource does not need to be configured on the low-delay UE.

Example 5: The base station broadcasts the second paging indication information on a fifth frequency-domain resource and the second paging time-domain resource, wherein the fifth frequency-domain resource is informed by the base station to the each UE over system information.

Example 5 is similar to example 2. It should be noted that in consideration that the low-delay UE does not need the second paging indication information, the non-low-delay UE may store the fifth frequency-domain resource, whereas the low-delay UE does not need to store the fifth frequency-domain resource.

Example 6: The base station broadcasts the second paging indication information on a sixth frequency-domain resource and the second paging time-domain resource, wherein a first frequency-domain parameter in the third frequency-domain resource is pre-configured for the each UE, and a second frequency-domain parameter in the sixth frequency-domain resource is notified by the base station to the each UE over the system information.

Example 6 is similar to example 3.

In fact, embodiments of the present disclosure set no limitation to the application manner for the second paging time-domain resource.

For example, the second paging time-domain resource refers to a time-domain resource pre-configured for the each UE. This allocation manner reduces occupation of the transmission resources for notifying the time-domain resource because a pre-agreement is made between the base station and the UE.

Still for example, the second paging time-domain resource is notified by the base station to the each UE over system information. This allocation manner is more flexible, and reduces the parameter configurations on the UE side.

Yet still for example, a first time-domain parameter in the second paging time-domain resource is pre-configured for the each UE, and a second time-domain parameter in the second paging time-domain resource is notified by the base station to the each UE over system information. In consideration that the time-domain resource is generally indicated by two time-domain parameters, for example, a time-domain start parameter and a time-domain offset parameter, or a time-domain start parameter and a time-domain end parameter, one of the time-domain parameters may be pre-configured for the each UE, and the other time-domain parameter may be notified by the base station to the each UE over system information. In this way, the time-domain resource may be flexibly configured, and the parameter configurations on the UE side may be appropriately reduced.

It should be noted that in consideration that the low-delay UE does not need the second paging indication information, the non-low-delay UE may configure or store the fifth frequency-domain resource, whereas the low-delay UE does not need to configure or store the fifth frequency-domain resource.

In step 404, when the capability information indicates that the UE is a low-delay UE, the UE determines a corresponding bit of a corresponding group of the UE in first paging indication information based on a UE identifier of the UE.

To determine whether the UE is paged, the UE may read capability information thereof. When the capability information indicates that the UE is a low-delay UE, a corresponding group of the UE may be determined based on the UE identifier of the UE, and a corresponding group number of the UE may be determined as the corresponding bit of the corresponding group the UE in the first paging indication information.

Specifically, the UE may the corresponding group number of the UE based on the UE identifier thereof and in combination with a configured calculation manner and a calculation parameter in the system information, and use the corresponding group number of the UE as the corresponding bit of the corresponding group of the UE in the first paging indication information. The specific determination process is similar to that on the base station side.

Nevertheless, the UE may also determine the corresponding group of the UE in combination with the configured calculation manner, and the calculation parameter and offset parameter in the system information. The specific determination process is similar to that on the base station side.

In step 405, the UE receives the first paging indication information on the first paging time-domain resource.

The UE may receive the first paging indication information on a known frequency-domain resource and the configured first paging time-domain resource. Corresponding to the above examples 1 to 3, the UE may receive the first paging indication information in the following three manners:

Manner 1: When the capability information indicates that the UE is a low-delay UE, the UE receives the first paging indication information on a first frequency-domain resource and the first paging time-domain resource, wherein the first frequency-domain resource refers to a frequency-domain resource pre-configured for the UE.

Manner 2: When the capability information indicates that the UE is a low-delay UE, the UE receives the first paging indication information on a second frequency-domain resource and the first paging time-domain resource, wherein the second frequency-domain resource is notified by the base station to the UE over system information.

Manner 3: When the capability information indicates that the UE is a low-delay UE, the UE receives the first paging indication information on a third frequency-domain resource and the first paging time-domain resource, wherein a first frequency-domain parameter in the third frequency-domain resource is pre-configured for the each UE, and a second frequency-domain parameter in the third frequency-domain resource is notified by the base station to the each UE over system information.

In step 406, the UE determines whether the bit, corresponding to a UE group, of the first paging indication information indicates that the corresponding UE group is paged. The UE sends location information of the UE the base station if the bit, corresponding to a UE group, of the first paging indication information indicates that the corresponding UE group is paged; and otherwise, the UE ignores the first paging indication information.

If the value of the bit, corresponding to a UE group, of the first paging indication information is 1 (or 0), it may be determined that the corresponding UE group is paged, that is, a paged UE is present in the corresponding UE group. In this case, to meet the requirement imposed by a low-delay UE on communication delay, the UE directly sends the location information to the base station. If the value of the bit, corresponding to a UE group, of the first paging indication information is 0 (or 1), it may be determined that the corresponding UE group is not paged, that is, no paged UE is present in the corresponding UE group. In this case, the UE may ignore the first paging indication information.

It should be noted that the processes in which the UE receives the first paging indication information and judged whether the UE is paged are cyclically performed, and a cycle for the processes is the same as that for the base station broadcasts the first paging indication information.

In step 407, upon receiving the location information of the UE, the base station sends a paging message to the UE based on the location information of the UE.

When the base station receives the location information of the UE, the base station may directionally sent a beam bearing the paging message to the UE by beamforming based on the location information of the UE, wherein the paging message may carry the UE identifier of a paging initiator and UE identifier of the paged UE and the like information.

It should be noted that because a paged UE and an unpaged UE may be present in a UE group, if the bit, corresponding to a UE group, of the first paging indication indicates that this UE group is paged, even a UE in this UE group is not paged, the base station may still receive the location information sent by the UE. In this case, the base station may send the paging message to a UE whose UE identifier is the same as the UE identifier of the paged UE based on the UE identifier of the paged UE in the paging message.

According to embodiments of the present disclosure, first paging indication information and second paging indication information are acquired based on a UE identifier of each UE and current paging details of the each UE; the paging indication information is broadcasted such that a low-delay UE may determine a corresponding bit thereof in the paging indication information based on the UE identifier thereof; when the bit indicates that a UE group corresponding to the UE is paged, location information of the UE is sent to a base station, such that the base station may page the UE based on the location information quickly; and meanwhile, since an information amount of the paging indication information is greatly reduced relative to paging messages, relative to broadcasting paging messages in a multi-beam manner, broadcasting the paging indication information reduces occupation of transmission resources.

FIG. 5 is a flowchart of a paging method according to an exemplary embodiment of the present disclosure. Referring to FIG. 5, the method may include the following steps:

In step 501, a base station acquires first paging indication information and at least one piece of second paging indication information based on current paging details of each UE and a UE identifier of the each UE.

Step 501 is similar to step 401.

In step 502, the base station broadcasts the first paging indication information on a first paging time-domain resource, wherein the first paging time-domain resource reuses a time-domain resource for an information synchronization.

Step 502 is similar to step 402.

In step 503, the base station broadcasts the at least one piece of second paging indication information on a second paging time-domain resource.

Step 503 is similar to step 403.

In step 504, when the capability information indicates that the UE is a non-low-delay UE, the UE determines a bit, corresponding to a UE group, of the first paging indication information, corresponding second paging indication information of the UE and a bit, corresponding to the UE, of the second paging indication information based on a UE identifier of the UE.

Specifically, the UE may read the capability information thereof. When the capability information indicates that the UE is a non-low-delay UE, the UE group corresponding to the UE and the serial number of the UE in the corresponding UE group may be determined based on the UE identifier of the UE; the group number of the corresponding UE group may be determined as a bit, corresponding to the UE group, of first paging indication information, and determined as the serial number of the second paging indication information corresponding to the UE; and the serial number of the UE in the corresponding group is determined as a bit, corresponding to the UE, of the second paging indication information. The specific determination process is similar to that on the base station side.

In fact, when the capability information indicates that the UE is a non-low-delay UE, the UE may determine the corresponding group of the UE and a serial number of the UE in the corresponding group based on the UE identifier of the UE. The specific determination process is similar to that on the base station side.

In step 505, the UE receives the first paging indication information on the first paging time-domain resource.

The UE may receive the first paging indication information on a known frequency-domain resource and the configured first paging time-domain resource. The specific receiving process is similar to that in step 404.

In step 506, the UE judges whether the corresponding bit of the corresponding group of the UE in the first paging indication information indicates that the corresponding group of the UE is paged. The UE receives the second paging indication information on the second paging time-domain resource if the corresponding bit of the corresponding group of the UE in the first paging indication information indicates that the corresponding group of the UE is paged; and otherwise, the UE ignores the first paging indication information.

Specifically, if the value on the corresponding bit of the corresponding group of the UE in the first paging indication information is 1 (or 0), the UE may determine that the corresponding group of the UE is paged, and use the serial number of the corresponding paging indication information of the UE as a corresponding time-domain location of the paging indication information on the second time-domain resource, and receive the second paging indication information on a known frequency-domain resource and at the corresponding time-domain location on the second paging time-domain resource. The second paging time-domain resource refers to a time-domain resource pre-configured for the UE; or the second paging time-domain resource is notified by the base station to the UE over system information; wherein a first time-domain parameter of the second paging time-domain resource is pre-configured for the UE, and a second time-domain parameter of the second paging time-domain resource is notified by the base station to the UE over system information.

In addition, the known frequency-domain resource is similar to examples 4 to 6 in step 403.

For example, the UE receives the second paging indication information on a fourth frequency-domain resource and the second paging time-domain resource; or the UE receives the second paging indication information on a fifth frequency-domain resource and the second paging time-domain resource; or the UE receives the second paging indication information on a sixth frequency-domain resource and the second paging time-domain resource.

Nevertheless, if the value on the corresponding bit of the corresponding group of the UE in the first paging indication information is 0 (or 1), the UE may determine that the corresponding group of the UE is not paged, and the UE is not paged. Therefore, the UE may ignore the first paging indication information, and does not need to receive the second paging indication information.

In step 507, the UE determines whether the bit, corresponding to the UE, of the second paging indication information indicates that the UE is paged. The UE sends location information of the UE to the base station if the corresponding bit of the second paging indication information indicates that the UE is paged, and otherwise, the UE ignores the second paging indication information.

Specifically, if the value of the bit, corresponding to the UE, of the second paging indication information is 1 (or 0), it indicates that the UE is paged, and the UE sends the location information thereof to the base station; and if the value of the bit, corresponding to the UE, of the second paging indication information is 0 (or 1), it indicates that the UE is not paged, and the UE may ignore the second paging indication information.

In step 508, upon receiving location information of any UE, the base station sends a paging message to the UE based on the location information of the UE.

Step 508 is similar to step 407.

According to the embodiments of the present disclosure, first paging indication information and second paging indication information are acquired based on a UE identifier of each UE and current paging details of the each UE; the paging indication information is broadcasted such that a low-delay UE may determine a corresponding bit thereof of the paging indication information based on the UE identifier thereof; when the bit indicates that a corresponding UE group, the corresponding second paging indication information is continuously received, and when a corresponding bit of the second paging indication information indicates that the UE is paged, the location information of the UE is sent to a base station such that the base station may accurately page the UE based on the location information; and meanwhile, because an information amount of the paging indication information is greatly reduced relative to paging messages, relative to broadcasting paging messages in a multi-beam manner, broadcasting the paging indication information reduces occupation of transmission resources.

Figure 6:
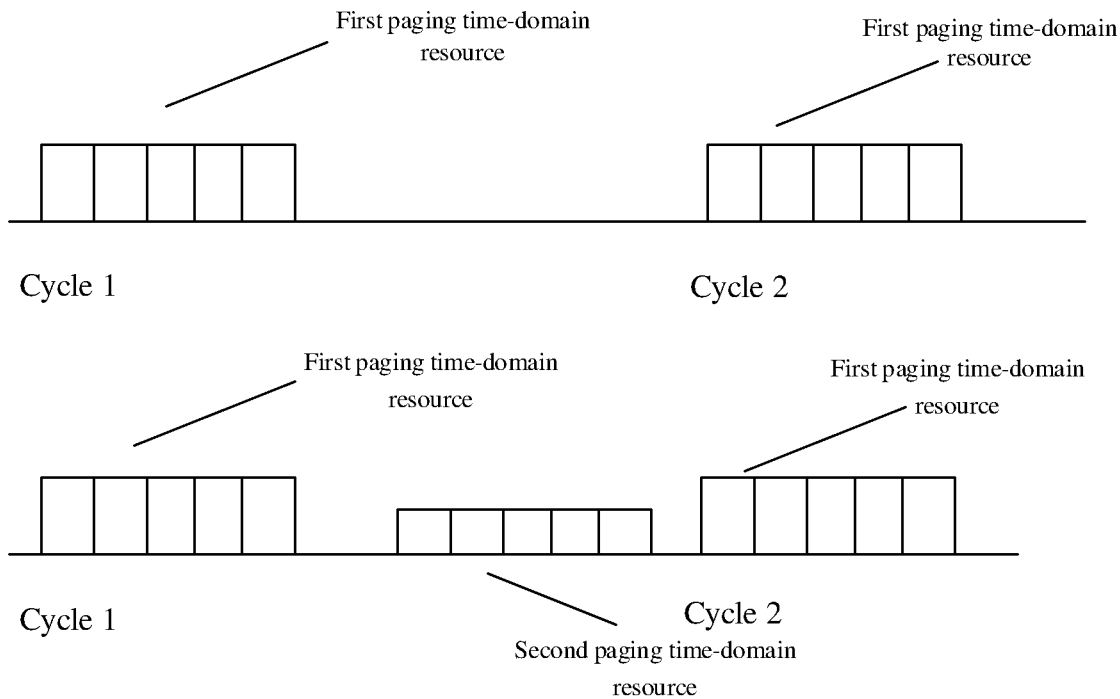
FIG. 6 is a schematic diagram of a paving time-domain resource according to an exemplary embodiment of the present disclosure.

Based on the interaction process between the base station and the low-delay UE according to the embodiment as illustrated in FIG. 4 and the interaction process between the base station and the non-low-delay UE according to the embodiment as illustrated in FIG. 5, referring to FIG. 6, a schematic diagram of a paging time-domain resource according to an exemplary embodiment is illustrated. A first paging time-domain resource is used for sending the first paging indication information in the above embodiment, and a second paging time-domain resource is used for sending the second paging indication information in the above embodiment. The low-delay UE receives the first paging indication information on the first paging time-domain resource, whereas the non-low-delay UE needs to receive the first paging indication information on the first paging time-domain resource, and determine, based on an indication given by the first paging indication information, whether to receive the second paging indication information on the second paging time-domain resource.

Figure 7A:
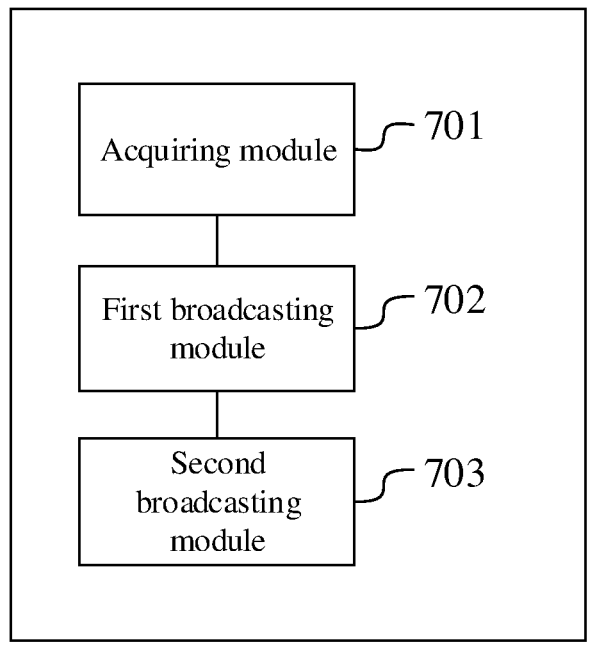
FIG. 7A is a block diagram of a paging apparatus according to an exemplary embodiment of the present disclosure.

FIG. 7A is a block diagram of a paging apparatus according to an exemplary embodiment of the present disclosure. Referring to FIG. 7A, the apparatus includes: an acquiring module 701, a first broadcasting module 702 and a second broadcasting module 703.

The acquiring module 701 is configured to acquire first paging indication information and at least one piece of second paging indication information based on current paging details of each User Equipment (UE) and a UE identifier of the each UE, a bit of the first paging indication information being configured to indicate whether a paged UE is present in a UE group, and a bit of the second paging indication information being configured to indicate whether a UE in a UE group is paged.

The first broadcasting module 702 is configured to broadcast the first paging indication information on a first paging time-domain resource, the first paging time-domain resource being a time-domain resource for an information synchronization.

The second broadcasting module 703 is configured to broadcast the at least one piece of second paging indication information on a second paging time-domain resource.

According to the embodiments of the present disclosure, first paging indication information and second paging indication information are acquired based on a UE identifier of each UE and current paging details of the each UE; the paging indication information is broadcasted such that a UE may determine a corresponding bit thereof in the paging indication information based on the UE identifier thereof; when the bit indicates that a corresponding group of the UE is paged, location information of the UE is sent to a base station such that the base station may page the UE based on the location information; and meanwhile, since an information amount of the paging indication information is greatly reduced relative to paging messages, relative to broadcasting paging messages in a multi-beam manner, broadcasting the paging indication information reduces occupation of transmission resources.

In a possible implementation, the acquiring module 701 is configured to:
determine a corresponding group of each UE and a serial number of the UE in the corresponding group based on the UE identifier of each UE;
determine a group number of a UE group as the bit, corresponding to the UE group, of the first paging indication information, and acquiring the first paging indication information based on the current paging details of each UE group and a bit, corresponding to the each UE group, of the first paging indication information; and
determine the group number of each UE group as a serial number of the second paging indication information corresponding to each UE group, determining a serial number of a UE in the corresponding UE group as a bit, corresponding to the UE, in the corresponding second paging indication information, and acquire the at least one piece of second paging indication information based on the current paging details of the each UE, the serial number of the second paging indication information corresponding to each UE group, and a bit, corresponding to each UE, of the second paging indication information.

In a possible implementation, the acquiring module 701 is configured to:
determine, based on the UE identifiers and capability information of each UE, a UE group corresponding to a low-delay UE and a serial number of the low-delay UE in the corresponding UE group, and determine a UE group corresponding to a non-low-delay UE and a serial number of the non-low-delay UE in the corresponding UE group;
determine a group number of a UE group as the bit, corresponding to the UE group, of the first paging indication information and acquire the first paging indication information based on the current paging details of each UE group and a bit, corresponding to the each UE group, of the first paging indication information; and
determine the group number of the non-low-delay UE group as a serial number of the second paging indication information corresponding to the non-low-delay UE group, determine a serial number of a non-low-delay UE in the corresponding UE group as a bit, corresponding to the non-low-delay UE, in the corresponding second paging indication information, and acquire the at least one piece of second paging indication information based on the current paging details of the each non-low-delay UE, the serial number of the second paging indication information corresponding to each non-low-delay UE group, and a bit, corresponding to each non-low-delay UE, of the second paging indication information.

In one possible implementation manner, the first broadcasting module 702 is configured to broadcast the first paging indication information on a first frequency-domain resource and the first paging time-domain resource, the first frequency-domain resource referring to a frequency-domain resource pre-configured for the each UE; or
the first broadcasting module is configured to broadcast the first paging indication information on a second frequency-domain resource and the first paging time-domain resource, the second frequency-domain resource being informed by a base station to the each UE over system information; or
the first broadcasting module is configured to the first paging indication information on a third frequency-domain resource and the first paging time-domain resource, a first frequency-domain parameter of the third frequency-domain resource being pre-configured for the each UE, and a second frequency-domain parameter of the third frequency-domain resource being informed by the base station to the each UE over the system information.

In one possible implementation manner, the second broadcasting module 703 is configured to broadcast the second paging indication information on a fourth frequency-domain resource and the second paging time-domain resource, the fourth frequency-domain resource referring to a frequency-domain resource pre-configured for the each UE; or the second broadcasting module 703 is configured to broadcast the second paging indication information on a fifth frequency-domain resource and the second paging time-domain resource, the fifth frequency-domain resource being informed by the base station to the each UE over system information; or the second broadcasting module 703 is configured to broadcast the second paging indication information on a sixth frequency-domain resource and the second paging time-domain resource, a first frequency-domain parameter of the sixth frequency-domain resource being pre-configured for the each UE, and a second frequency-domain parameter of the sixth frequency-domain resource being informed by the base station to the each UE over the system information.

In one possible implementation manner, the second paging time-domain resource refers to a time-domain resource pre-configured for the each UE; or the second paging time-domain resource is informed by the base station to the each UE over system information; or a first time-domain parameter in the second paging time-domain resource is pre-configured for the each UE, and a second time-domain parameter in the second paging time-domain resource is informed by the base station to the each UE over the system information.

Figure 7B:
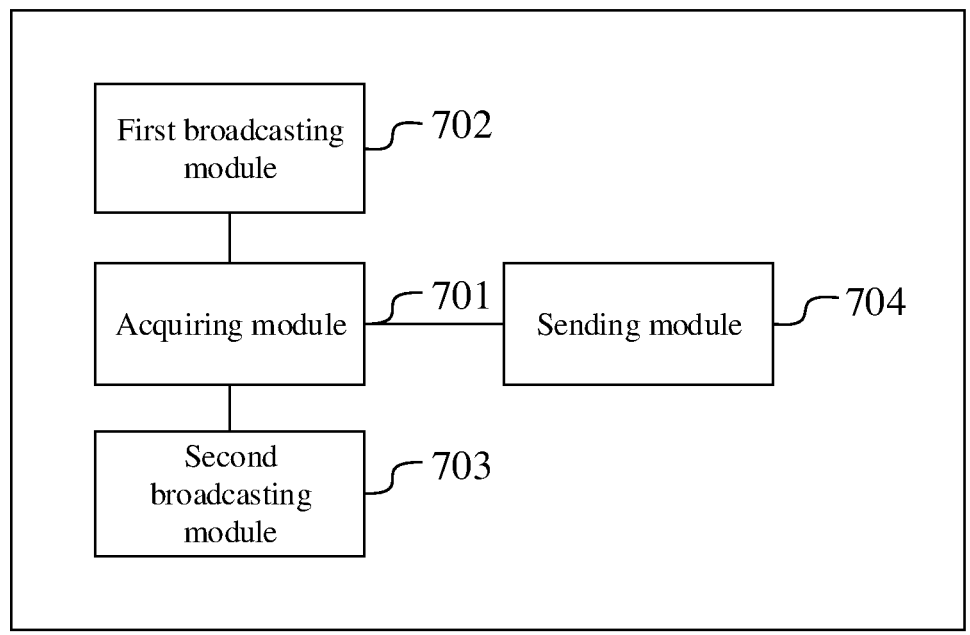
FIG. 7B is a block diagram of a paging apparatus according to an exemplary embodiment of the present disclosure.

In a possible implementation, based on composition of the apparatus as illustrated in FIG. 7A, referring to FIG. 7B, the apparatus further includes:

a sending module 704, configured to, upon receiving location information of any UE, send a paging message to the UE based on the location information of the UE.

All the above optional technical solutions may form the optional embodiments of the present disclosure in any combination, which are not described herein any further.

Figure 8A:
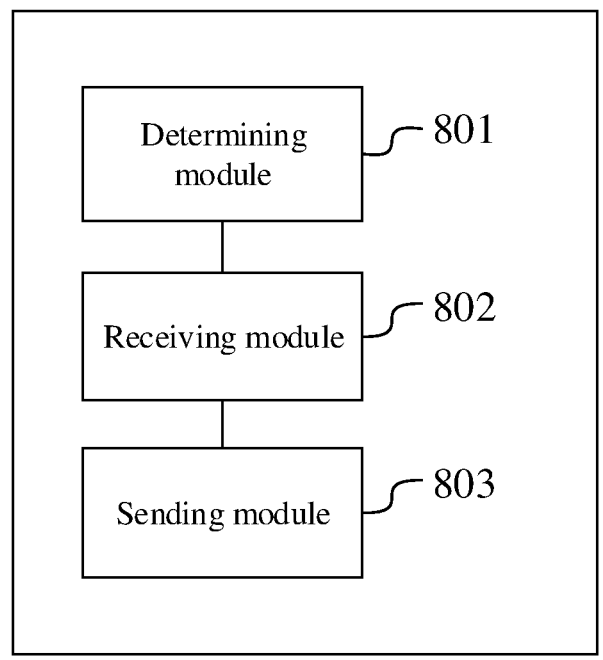
FIG. 8A is a block diagram of a paging apparatus according to an exemplary embodiment of the present disclosure.

FIG. 84 is a block diagram of a paging apparatus according to an exemplary embodiment of the present disclosure. Referring to FIG. 8A, the apparatus includes: a determining module 801, a receiving module 802 and a sending module 803.

The determining module 801 is configured determine, based on a UE identifier of the UE, a bit, corresponding to a UE group of the UE, of first paging indication information, when capability information indicates the LE is a low-delay UE, a bit of the first paging indication information being configured to indicate whether a paged UE is present in the UE group.

The receiving module 802 is configured to receive the first paging indication information on a first paging time-domain resource, the first paging time-domain resource being a time-domain resource for an information synchronization.

The sending module 803 is configured to send location information of the UE to a base station when the bit, corresponding to the UE group of the UE, of the first paging indication information indicates that the UE group of the UE is paged.

According to the embodiments of the present disclosure, a corresponding bit of a corresponding group of a UE in first paging indication information is determined based on an UE identifier of the UE; when the corresponding bit indicates that the corresponding group of the UE is paged, location information is sent to a base station such that the base station may page the UE based on the location information quickly; and meanwhile, since an information amount of the paging indication information is greatly reduced relative to paging messages, relative to broadcasting paging messages in a multi-beam manner, broadcasting the paging indication information reduces occupation of transmission resources.

In a possible implementation, the determining module 801 is configured to:

determine, based on the UE identifier of the UE, the UE group corresponding to the UE when the capability information indicates that the UE is a low-delay UE; and determine the serial number of the UE group corresponding to the UE as the bit, corresponding to the UE group of the UE, of the first paging indication information.

In one possible implementation manner, the receiving module 802 is further configured to receive the first paging indication information on a first frequency-domain resource and the first paging time-domain resource, the first frequency-domain resource referring to a frequency-domain resource pre-configured for the UE; or The receiving module 802 is further configured to receive the first paging indication information on a second frequency-domain resource and the first paging time-domain resource, the second frequency-domain resource being informed by the base station to the UE over system information; or the receiving module 802 is further configured to receive the first paging indication information on a third frequency-domain resource and the first paging time-domain resource, a first frequency-domain parameter in the third frequency-domain resource being pre-configured for the UE, and a second frequency-domain parameter in the third frequency-domain resource being informed by the base station to the UE over the system information.

Figure 8B:
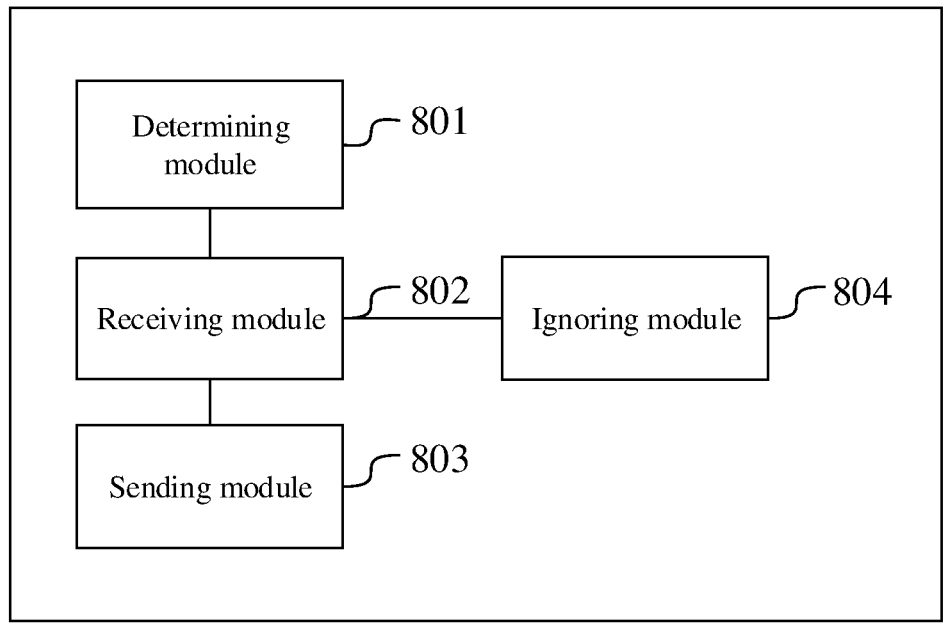
FIG. 8B is a block diagram of a paging apparatus according to an exemplary embodiment of the present disclosure.

In a possible implementation, based on composition of the apparatus as illustrated in FIG. 8A, referring to FIG. 8B, the apparatus further includes:

an ignoring module 804, configured to ignore the first paging indication information when the bit, corresponding to the UE group of the UE, of the first paging indication information indicates that the corresponding UE group is not paged.

All the above optional technical solutions may form the optional embodiments of the present disclosure in any combination, which are not described herein any further.

Figure 9A:
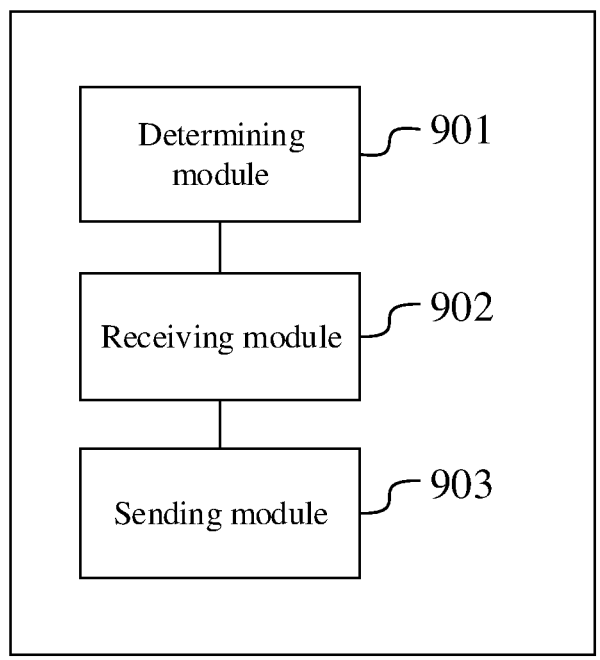
FIG. 9A is a block diagram of a paging apparatus according to an exemplary embodiment of the present disclosure.

FIG. 9A is a block diagram of a paging apparatus according to an exemplary embodiment of the present disclosure. Referring to FIG. 9A, the apparatus includes: a determining module 901, a receiving module 902 and a sending module 903.

The determining module 901 is configured to, when capability information indicates that the UE is a non-low-delay UE, determine, based on a UE identifier of the UE, a bit, corresponding to a UE group in which a UE presents, of first paging indication information, second paging indication information corresponding to the UE, and a bit, corresponding to the UE, of second paging indication information, the first paging time-domain resource being a time-domain resource for an information synchronization.

The receiving module 902 is configured to receive the first paging indication information on a first paging time-domain resource, a bit of the first paging indication information being configured to indicate whether a paged UE is present in a UE group.

The receiving module 902 is further configured to, when the bit, corresponding to the UE group of the UE, of the first paging indication information indicates that the UE group of the UE is paged, receive the second paging indication information on a second paging time-domain resource, a bit of the second paging indication information being configured to indicate whether a UE of the UE group in which the UE presents is paged.

The sending module 903 is configured to send location information of the UE to a base station when the bit, corresponding to the UE, of the second paging indication information indicates that the UE is paged.

According to the embodiments of the present disclosure, a bit, corresponding to a UE group, of the first paging indication information is determined based on a UE identifier of the UE; when the bit indicates that the corresponding UE group UE is paged, the corresponding second paging indication information is continuously received; when a bit, corresponding to a UE, of the corresponding second paging indication information indicates that the UE is paged, location information of the UE is sent to a base station, such that the base station may accurately pages the UE directly based on the location information; and in addition, since an information amount of the paging indication information is greatly reduced relative to paging messages, relative to broadcasting paging messages in a multi-beam manner, broadcasting the paging indication information reduces occupation of transmission resources.

In a possible implementation, the determining module 901 is configured to:

when capability information indicates that the UE is a non-low-delay UE, determine the UE group of the UE and a serial number of the UE in the corresponding UE group based on the UE identifier of the UE;

determine a group number of the UE as the bit, corresponding to the group of the UE, of the first paging indication information, and determining the group number of the UE as a serial number of the second paging indication information corresponding to the UE; and determine the serial number of the UE in the corresponding UE group as a bit, corresponding to the UE, of second paging indication information.

In one possible implementation manner, the receiving module 902 is configured to receive the first paging indication information on a first frequency-domain resource and the first paging time-domain resource, the first frequency-domain resource referring to a frequency-domain resource pre-configured for the UE; or the receiving module 902 is configured to receive the first paging indication information on a second frequency-domain resource and the first paging time-domain resource, the second frequency-domain resource being informed by the base station to the UE over system information; or the receiving module 902 is further configured to configured to receive the first paging indication information on a third frequency-domain resource and the first paging time-domain resource, a first frequency-domain parameter of the third frequency-domain resource being pre-configured for the UE, and a second frequency-domain parameter of the third frequency-domain resource being informed by the base station to the UE over the system information.

In one possible implementation manner, the receiving module 902 is further configured to, when the bit, corresponding to the UE group of the UE, of the first paging indication information indicates that the UE group of the UE is paged, receiving the second paging indication information on a fourth frequency-domain resource and the second paging time-domain resource, the fourth frequency-domain resource referring to a frequency-domain resource pre-configured for the UE; or the receiving module 902 is further configured to, when the bit, corresponding to the UE group of the UE, of the first paging indication information indicates that the UE group of the UE is paged, receiving the second paging indication information on a fifth frequency-domain resource and the second paging time-domain, the fifth frequency-domain resource being informed by the base station to the UE; or the receiving module 902 is further configured to, when the bit, corresponding to the UE group of the UE, of the first paging indication information indicates that the UE group of the UE is paged, receiving the second paging indication information on a sixth frequency-domain resource and the second paging time-domain, a first frequency-domain parameter of the sixth frequency-domain resource being pre-configured for the UE, and a second frequency-domain parameter of the sixth frequency-domain resource being informed by the base station to the UE.

In one possible implementation manner, the second paging time-domain resource refers to a time-domain resource pre-configured for the UE; or the second paging time-domain resource is informed by the base station to the UE over system information; or a first time-domain parameter in the second paging time-domain resource is pre-configured for the UE, and a second time-domain parameter in the second paging time-domain resource is informed by the base station to the each UE over the system information.

Figure 9B:
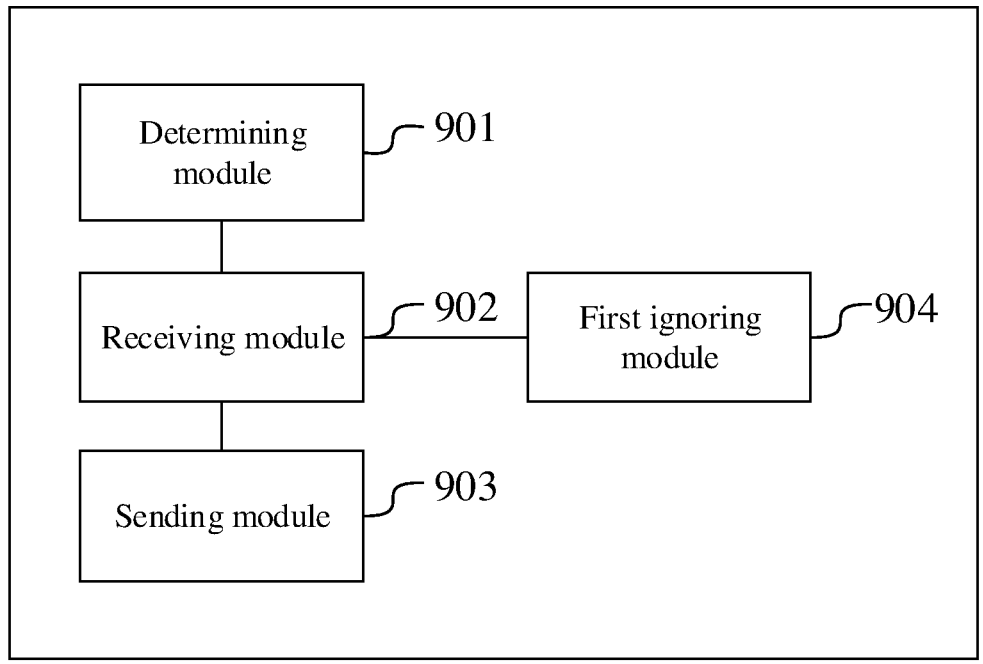
FIG. 9B is a block diagram of a paging apparatus according to an exemplary embodiment of the present disclosure.

In a possible implementation, based on composition of the apparatus as illustrated in FIG. 9A, referring to FIG. 9B, the apparatus further includes:

a first ignoring module 904, configured to ignore the first paging indication information if the corresponding bit of the corresponding group of the UE in the first paging indication information indicates that the corresponding group of the UE is not paged.

Figure 9C:
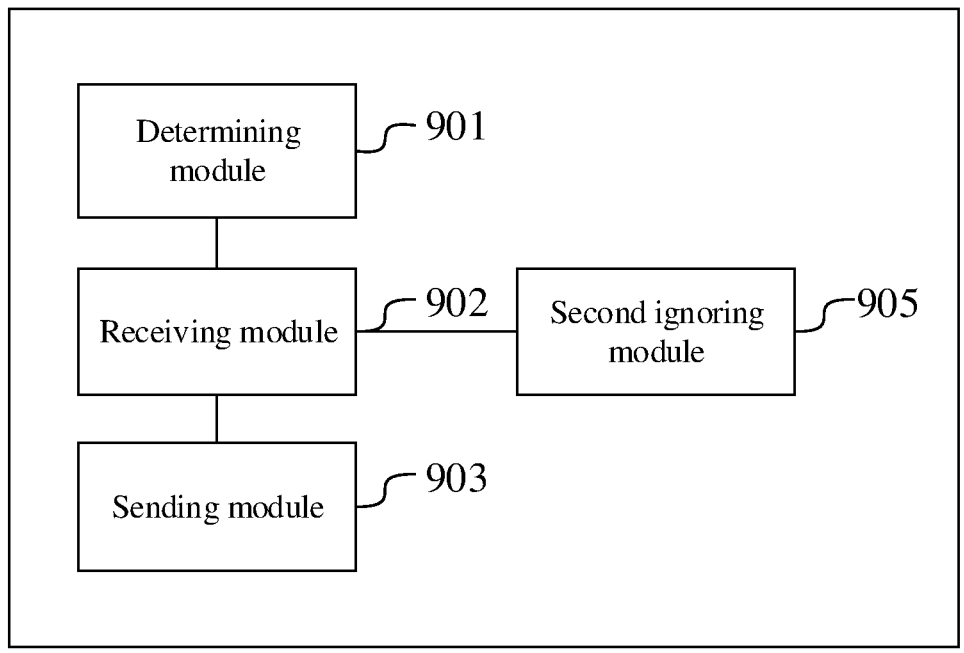
FIG. 9C is a block diagram of a paging apparatus according to an exemplary embodiment of the present disclosure.

In a possible implementation, based on composition of the apparatus as illustrated in FIG. 9A, referring to FIG. 9C, the apparatus further includes:

a second ignoring module 905, configured to ignore the first paging indication information when the bit, corresponding to the UE group of the UE, of the first paging indication information indicates that the corresponding UE group is not paged.

All the above optional technical solutions may form the optional embodiments of the present disclosure in any combination, which are not described herein any further.

It should be noted that, during paging by the paging apparatuses according to the above embodiments, the apparatuses are described by only using division of the above functional modules as examples. In practice, the functions may be assigned to different functional modules for implementation as required. To be specific, the internal structure of the apparatus is divided into different functional modules to implement all or part of the above-described functions. In addition, the paging apparatus according to the above embodiments is based on the same inventive concept as the paging method according to the embodiments of the present invention. The specific implementation is elaborated. In the method embodiments, which is not be detailed herein any further.

Figure 10:
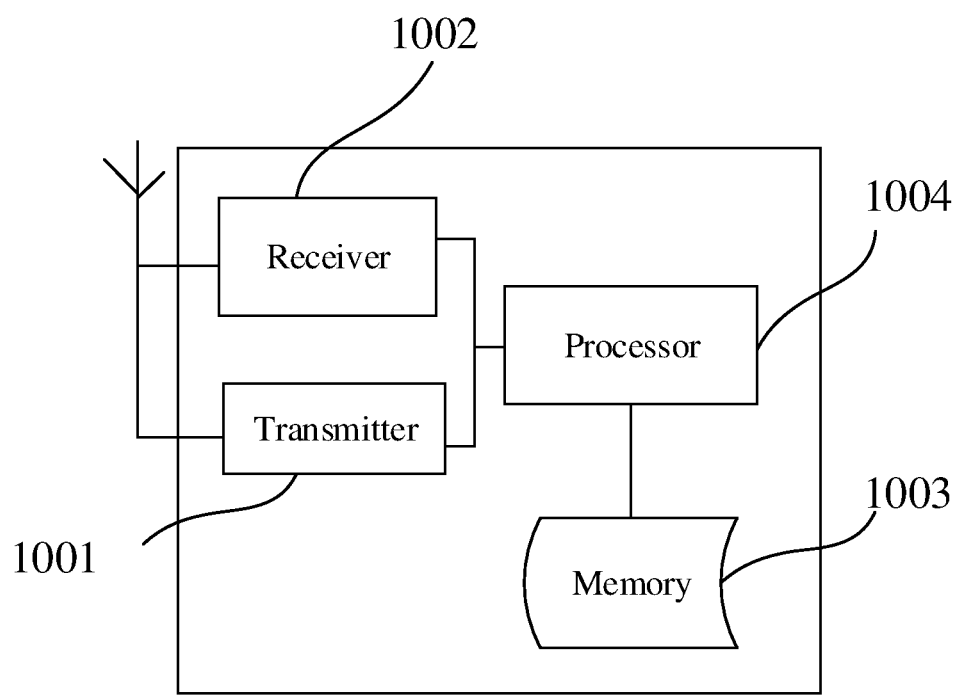
FIG. 10 is a schematic structural diagram of a paging apparatus according embodiment of the present disclosure.

FIG. 10 is a schematic structural diagram of a paging apparatus according to an exemplary embodiment of the present disclosure. As illustrated in FIG. 10, the apparatus may be provided as a base station, and includes a transmitter 1001, a receiver 1002, a memory 1003 and a processor 1004 that is connected to the transmitter, the receiver and the memory respectively. Nevertheless, the apparatus may further include an antenna, a baseband processing component, a middle radio frequency processing component, an input and output device and the like universal components, which are not limited in the embodiment of the present disclosure. The processor 1004 is configured to perform the method on the base station side in the above method embodiments.

Figure 11:
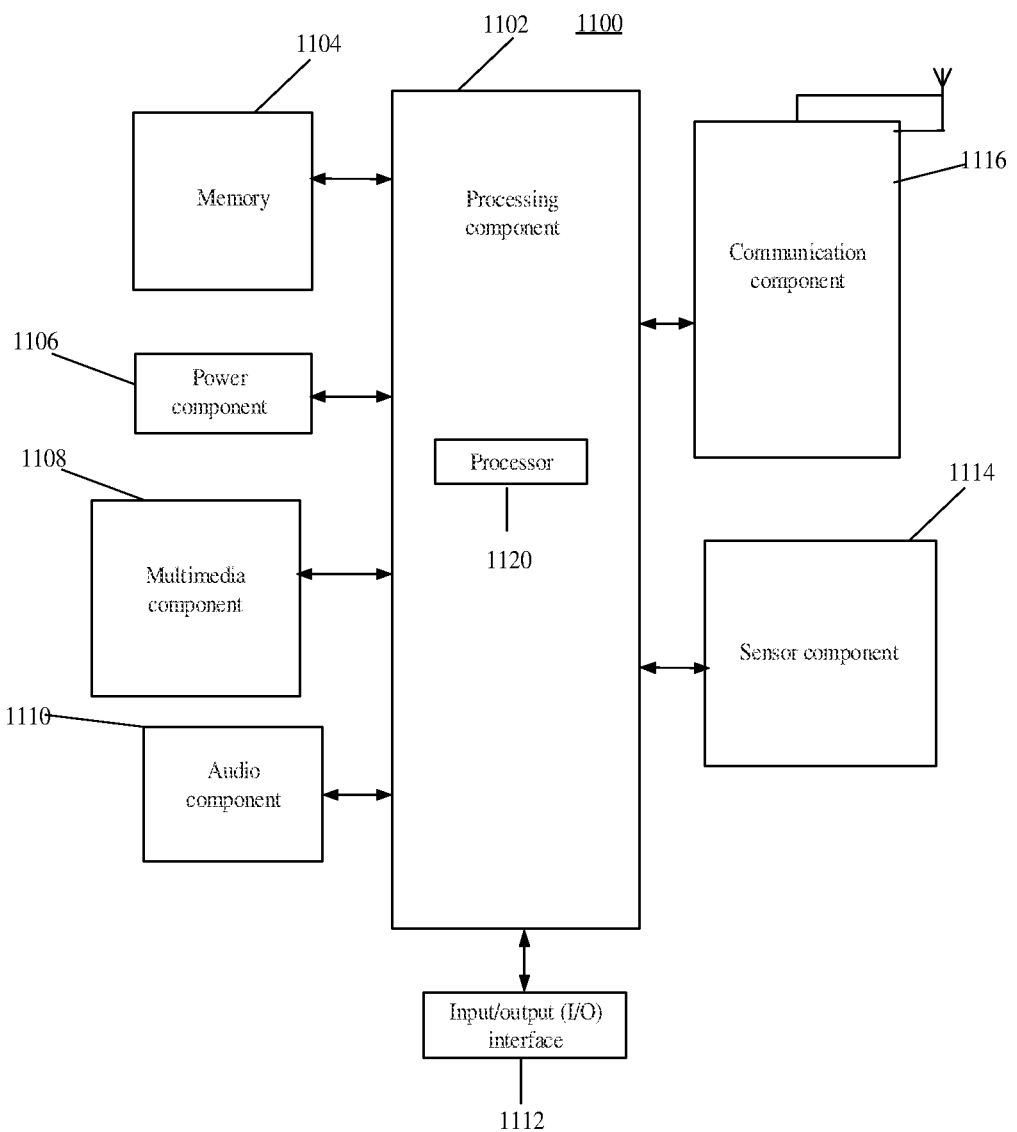
FIG. 11 is a block diagram of a paging apparatus 1100 according to an exemplary embodiment of the present disclosure.

FIG. 11 is a schematic structural diagram of a paging apparatus 1100 according to an exemplary embodiment of the present disclosure. For example, the apparatus 1100 may be a mobile phone, a computer, a digital broadcast terminal, a messaging device, a gaming console, a tablet device, a medical device, fitness equipment, a personal digital assistant, and other UE.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls the overall operations of the apparatus 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, contact data, phonebook data, messages, pictures, videos, etc. The memory 1104 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 1108 includes a front camera and/or a rear camera. The front camera and the rear camera may receive external multimedia data while the apparatus 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive external audio signals when the apparatus 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker for outputting audio signals.

The I/O interface 1112 provides an interface between the processing component 1102 and peripheral interface modules, such as a keyboard, a click wheel, buttons, and the like. The buttons may include, but are not limited to, a home button, a volume button, a start button, and a lock button.

The sensor component 1114 includes one or more sensors to provide status assessments of various aspects of the apparatus 1100. For instance, the sensor component 1114 may detect an on/off status of the apparatus 1100, relative positioning of components, e.g., the display device and the mini keyboard of the apparatus 1100, and the sensor component 1114 may also detect a position change of the apparatus 1100 or a component of the apparatus 1100, presence or absence of user contact with the apparatus 1100, orientation or acceleration/deceleration of the apparatus 1100, and temperature change of the apparatus 1100. The sensor component 1114 may include a proximity sensor configured to detect the presence of nearby objects without any physical contact. The sensor component 1114 may also include a light sensor, such as a CMOS or CCD image sensor, used for imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the apparatus 1100 and other devices. The apparatus 1100 can access a wireless network based on a communication standard, such as WiFi, 2G, or 3G, or a combination thereof. In an exemplary embodiment, the communication component 1116 receives broadcast signals or broadcast associated information from an external broadcast management system via a broadcast channel. In an exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods on the UE side:

determining a corresponding bit of a corresponding group of the UE in first paging indication information based on a UE identifier of the UE when capability information indicates that the UE is a low-delay UE, a bit of the first paging indication information being used for indicating whether a paged UE is present in a group of UEs; receiving the first paging indication information on a first paging time-domain resource, the first paging time-domain resource multiplexing a time-domain resource for an information synchronization; and sending location information of the UE to a base station if the corresponding bit of the corresponding group of the UE in the first paging indication information indicates that the corresponding group of the UE is paged; or determining a corresponding bit of a corresponding group of the UE in first paging indication information, corresponding second paging indication information of the UE and a corresponding bit of the UE in the second paging indication information based on a UE identifier of the UE when capability information indicates that the UE is a non-low-delay UE, first paging time-domain resource being a time-domain resource for an information synchronization; receiving the first paging indication information on the first paging time-domain resource, a bit of the first paging indication information being used for indicating whether a paged UE is present in a group of UEs; receiving the second paging indication information on a second paging tune-domain resource if the corresponding bit of the corresponding group of the UE in the first paging indication information indicates that the corresponding group of the UE is paged, a bit of the second paging indication information being used for indicating whether a UE in a group of UEs where the UE is located is paged; and sending location information of the UE to a base station if the corresponding bit of the UE in the second paging indication information indicates that the UE is paged.

In exemplary embodiments, a non-transitory computer-readable storage medium including instructions is also provided, such as the memory 1104 including instructions, executable by the processor 1120 in the apparatus 1100, for performing the above-described methods. For example, the non-transitory computer-readable storage medium may be a ROM, a RAM, a CD-ROM, a magnetic tape, a floppy disc, an optical data storage device, and the like.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A paging method, applied to a base station, the method comprising:

determining a corresponding group of each user equipment (UE) and a serial number of the UE in the corresponding group, acquiring first paging indication information and acquiring at least one piece of second paging indication information based on a UE identifier of each UE, a bit of the first paging indication information being configured to indicate whether a paged UE is present in a UE group, and a bit of the second paging indication information being configured to indicate whether a UE in a UE group is paged;

wherein the acquiring first paging indication information comprises: determining a group number of each UE group as a bit, corresponding to the UE group, of the first paging indication information, and acquiring the first paging indication information based on current paging details of each UE group and a bit corresponding to the each UE group respectively, of the first paging indication information;

wherein the acquiring at least one piece of second paging indication information comprises: determining the group number of each UE group as a serial number of second paging indication information corresponding to each UE group, determining the serial number of a UE in the corresponding UE group as a bit, corresponding to the UE, in the corresponding second paging indication information, and acquiring the at least one piece of second paging indication information based on current paging details of each UE, serial numbers of the second paging indication information corresponding to each UE group, and a bit, corresponding to each UE respectively, of the corresponding second paging indication information;

broadcasting the first paging indication information on a first paging time-domain resource, the first paging time-domain resource being a time-domain resource for an information synchronization; and broadcasting the at least one piece of second paging indication information on a second paging time-domain resource.

2. The method according to claim 1, wherein the UE comprises low-delay UE and non-low-delay UE, and the determining a corresponding group of each UE and a serial number of the UE in the corresponding group further comprises:

determining, based on the UE identifier and capability information of each UE, a UE group corresponding to low-delay UEs and a serial number of each low-delay UE in the corresponding UE group, and determining a UE group corresponding to non-low-delay UEs and a serial number of each non-low-delay UE in the corresponding UE group;

wherein the acquiring at least one piece of second paging indication information further comprises: determining the group number of the non-low-delay UE group as a serial number of the second paging indication information corresponding to the non-low-delay UE group, determining a serial number of each non-low-delay UE in the corresponding UE group as a bit, corresponding to each non-low-delay UE respectively, in the corresponding second paging indication information, and acquiring the at least one piece of second paging indication information based on the current paging details of the each non-low-delay UE, the serial number of the second paging indication information corresponding to each non-low-delay UE group, and a bit, corresponding to each non-low-delay UE, of the corresponding second paging indication information.

3. The method according to claim 1, wherein the broadcasting the first paging indication information on a first paging time-domain resource comprises:

broadcasting the first paging indication information on a first frequency-domain resource and the first paging time-domain resource, the first frequency-domain resource referring to a frequency-domain resource preconfigured for the each UE; or broadcasting the first paging indication information on a second frequency-domain resource and the first paging time-domain resource, the second frequency-domain resource being informed by a base station to the each UE over system information; or broadcasting the first paging indication information on a third frequency-domain resource and the first paging time-domain resource, a first frequency-domain parameter of the third frequency-domain resource being preconfigured for the each UE, and a second frequency-domain parameter of the third frequency-domain resource being informed by the base station to the each UE over the system information.

4. The method according to claim 1, wherein the broadcasting the at least one piece of second paging indication information on a second paging time-domain resource comprises:
   broadcasting the second paging indication information on a fourth frequency-domain resource and the second paging time-domain resource, the fourth frequency-domain resource referring to a frequency-domain resource pre-configured for the each UE; or
   broadcasting the second paging indication information on a fifth frequency-domain resource and the second paging time-domain resource, the fifth frequency-domain resource being informed by the base station to the each UE over system information; or
   broadcasting the second paging indication information on a sixth frequency-domain resource and the second paging time-domain resource, a first frequency-domain parameter of the sixth frequency-domain resource being pre-configured for the each UE, and a second frequency-domain parameter of the sixth frequency-domain resource being informed by the base station to the each UE over the system information.

5. The method according to claim 1, wherein
   the second paging time-domain resource refers to a time-domain resource pre-configured for the each UE; or
   the second paging time-domain resource is informed by the base station to the each UE over system information; or
   a first time-domain parameter of the second paging time-domain resource is pre-configured for the each UE, and a second time-domain parameter of the second paging time-domain resource is informed by the base station to the each UE over the system information.

6. The method according to claim 1, further comprising:
   upon receiving location information of any UE, sending a paging message to the UE based on the location information of the UE.

7. A paging method, applied to a user equipment (UE), the method comprising:
   when capability information indicates the UE is a low-delay UE, determining a UE group of the UE based on a UE identifier of the UE, and determining a serial number of the UE group of the UE as a bit, corresponding to the UE group of the UE, of first paging indication information, the bit of the first paging indication information being configured to indicate whether a paged UE is present in the UE group;
   receiving the first paging indication information on a first paging time-domain resource, the first paging time-domain resource being a time-domain resource for an information synchronization; and
   sending location information of the UE to a base station when the bit, corresponding to the UE group of the UE, of the first paging indication information indicates that the UE group of the UE is paged.

8. The method according to claim 7, wherein the receiving the first paging indication information on a first paging time-domain resource comprises:
   receiving the first paging indication information on a first frequency-domain resource and the first paging time-domain resource, the first frequency-domain resource referring to a frequency-domain resource pre-configured for the UE; or
   receiving the first paging indication information on a second frequency-domain resource and the first paging time-domain resource, the second frequency-domain resource being informed by the base station to the UE over system information; or
   receiving the first paging indication information on a third frequency-domain resource and the first paging time-domain resource, a first frequency-domain parameter of the third frequency-domain resource being pre-configured for the UE, and a second frequency-domain parameter of the third frequency-domain resource being informed by the base station to the UE over the system information.

9. The method according to claim 7, wherein after receiving the first paging indication information on a first paging time-domain resource, the method further comprises:
   ignoring the first paging indication information when the bit, corresponding to the UE group of the UE, of the first paging indication information indicates that the corresponding UE group is not paged.

10. A paging method, applied to a user equipment (UE), the method comprising:
    when capability information indicates that the UE is a non-low-delay UE, determining a UE group of the UE and a serial number of the UE in the UE group based on a UE identifier of the UE;
    determining a group number of the UE group as a bit, corresponding to the UE group, of first paging indication information, and determining the group number of the UE group as a serial number of second paging indication information corresponding to the UE group;
    determining the serial number of the UE in the UE group as a bit, corresponding to the UE, of the second paging indication information;
    receiving the first paging indication information on a first paging time-domain resource, a bit of the first paging indication information being configured to indicate whether a paged UE is present in a UE group, the first paging time-domain resource being a time-domain resource for an information synchronization;
    when the bit, corresponding to the UE group of the UE, of the first paging indication information indicates that the UE group of the UE is paged, receiving the second paging indication information on a second paging time-domain resource, the bit of the second paging indication information being configured to indicate whether a UE of the UE group is paged; and
    sending location information of the UE to a base station when the bit, corresponding to the UE, of the second paging indication information indicates that the UE is paged.

11. The method according to claim 10, wherein the receiving the first paging indication information on a first paging time-domain resource comprises:
    receiving the first paging indication information on a first frequency-domain resource and the first paging time-domain resource, the first frequency-domain resource referring to a frequency-domain resource pre-configured for the UE; or
    receiving the first paging indication information on a second frequency-domain resource and the first paging time-domain resource, the second frequency-domain resource being informed by the base station to the UE over system information; or
    receiving the first paging indication information on a third frequency-domain resource and the first paging time-domain resource, a first frequency-domain parameter in the third frequency-domain resource being pre-configured for the UE, and a second frequency-domain parameter in the third frequency-domain resource being informed by the base station to the UE over the system information.

12. The method according to claim 10, wherein the when the bit, corresponding to the UE group of the UE, of the first paging indication information indicates that the UE group of the UE is paged, receiving the second paging indication information on a second paging time-domain resource comprises:
  when the bit, corresponding to the UE group of the UE, of the first paging indication information indicates that the UE group of the UE is paged, receiving the second paging indication information on a fourth frequency-domain resource and the second paging time-domain resource, the fourth frequency-domain resource referring to a frequency-domain resource pre-configured for the UE; or
  when the bit, corresponding to the UE group of the UE, of the first paging indication information indicates that the UE group of the UE is paged, receiving the second paging indication information on a fifth frequency-domain resource and the second paging time-domain, the fifth frequency-domain resource being informed by the base station to the UE; or
  when the bit, corresponding to the UE group of the UE, of the first paging indication information indicates that the UE group of the UE is paged, receiving the second paging indication information on a sixth frequency-domain resource and the second paging time-domain, a first frequency-domain parameter of the sixth frequency-domain resource being pre-configured for the UE, and a second frequency-domain parameter of the sixth frequency-domain resource being informed by the base station to the UE.

13. The method according to claim 10, wherein
  the second paging time-domain resource refers to a time-domain resource pre-configured for the UE; or
  the second paging time-domain resource is informed by the base station to the UE over system information; or
  a first time-domain parameter in the second paging time-domain resource is pre-configured for the UE, and a second time-domain parameter in the second paging time-domain resource is informed by the base station to each UE over the system information.

14. The method according to claim 10, wherein after receiving the first paging indication information on a first paging time-domain resource, the method further comprises:
  ignoring the first paging indication information when the bit, corresponding to the UE group of the UE, of the first paging indication information indicates that the corresponding UE group is not paged.

15. The method according to claim 10, wherein when the bit, corresponding to the UE group of the UE, of the first paging indication information indicates that the UE group of the UE is paged, after receiving the second paging indication information on a second paging time-domain resource, the method further comprises:
  ignoring the second paging indication information when the bit, corresponding to the UE, of the second paging indication information indicates that the corresponding UE is not paged.

* * * * *